United States Patent
Furlan et al.

(10) Patent No.: US 6,331,869 B1
(45) Date of Patent: Dec. 18, 2001

(54) METHOD AND APPARATUS FOR ELECTRONICALLY DISTRIBUTING MOTION PANORAMIC IMAGES

(75) Inventors: John Louis Warpakowski Furlan, Palo Alto; Edward Driscoll, Jr., Portola Valley, both of CA (US)

(73) Assignee: Be Here Corporation, Cupertino, CA (US)

( * ) Notice: Subject to any disclaimer, the term of this patent is extended or adjusted under 35 U.S.C. 154(b) by 0 days.

(21) Appl. No.: 09/131,186

(22) Filed: Aug. 7, 1998

(51) Int. Cl.[7] ................................................. H04N 7/18

(52) U.S. Cl. .............................................. 348/36; 348/39

(58) Field of Search ................. 348/36–61; 382/232–234

(56) References Cited

U.S. PATENT DOCUMENTS

| | | |
|---|---|---|
| Re. 36,207 | 5/1999 | Zimmerman et al. . |
| D. 263,716 | 4/1982 | Globus et al. . |
| D. 312,263 | 11/1990 | Charles . |
| 2,146,662 | 2/1939 | Van Albada . |
| 2,244,235 | 6/1941 | Ayres . |
| 2,304,434 | 12/1942 | Ayres . |
| 2,628,529 | 2/1953 | Braymer . |
| 2,654,286 | 10/1953 | Cesar . |
| 3,203,328 | 8/1965 | Brueggeman . |
| 3,205,777 | 9/1965 | Benner . |
| 3,229,576 | 1/1966 | Rees . |
| 3,692,934 | 9/1972 | Herndon . |
| 3,723,805 | 3/1973 | Scarpino et al. . |
| 3,785,715 | 1/1974 | Mecklenborg . |
| 3,832,046 | 8/1974 | Mecklenborg . |
| 3,846,809 | 11/1974 | Pinzone et al. . |
| 3,872,238 | 3/1975 | Herndon . |
| 3,934,259 | 1/1976 | Krider . |

(List continued on next page.)

FOREIGN PATENT DOCUMENTS

| | | |
|---|---|---|
| 1234341 | 5/1960 | (FR) . |
| 2 221 118A | 1/1990 | (GB) . |
| 2289820 | 11/1995 | (GB) . |
| HEI 2-127877 | 11/1988 | (JP) . |

OTHER PUBLICATIONS

Supplemental Information Disclosure Statement in re: the Application of Steven D. Zimmerman, et al. U.S. application No. 08/662,410: 08 Pages including PTO 1449 Form citing 19 references. Filed Jul. 12, 1996. Filed: Jul. 12, 1996.*

Heckbert, P., "Survey of Texture Mapping" IEEE CG&A, Nov. 1986, pp. 56–57.*

Defendants IPI's Notice of Reliance of Prior Art and Witnesses, Civil Action of Interactive Pictures Corporation, A/K/A Omniview, Inc. v. Infinite Pictures, Inc. and Bill Tillman, Case No. 3–96–849; 05 Pages. Filed: Dec. 8, 1997, in U.S.D.C., Eastern District of Tenessee.*

(List continued on next page.)

Primary Examiner—Andy Rao
(74) Attorney, Agent, or Firm—Daniel B. Curtis; Dag H. Johansen

(57) ABSTRACT

The present invention discloses an electronic image distribution apparatus for distributing motion panoramic images. The main portion of the apparatus is a motion panoramic image server that has a source of motion panoramic images. The source of panoramic image frames may be a motion panoramic image playback device or a connection to a motion panoramic camera system. The motion panoramic image server transforms the panoramic image frames into an intermediate format that is more conducive for electronic transmission. The motion panoramic image server then transmits the motion panoramic images to client systems. A first panoramic image transmission system divides the intermediate planar representation into individual tiles and transmits tiles that are requested by client systems. A second panoramic image transmission system divides the intermediate planar representation into individual tiles and transmits the individual tiles on different multicast channels. Client systems then subscribe to the multicast channels needed to render an image in the direction of a desired view.

42 Claims, 18 Drawing Sheets

U.S. PATENT DOCUMENTS

| | | |
|---|---|---|
| 3,998,532 | 12/1976 | Dykes . |
| 4,012,126 | 3/1977 | Rosendahl et al. . |
| 4,017,145 | 4/1977 | Jerie . |
| 4,038,670 | 7/1977 | Seitz . |
| 4,058,831 | 11/1977 | Smith . |
| 4,078,860 | 3/1978 | Globus et al. . |
| 4,157,218 | 6/1979 | Gordon et al. . |
| 4,190,866 | 2/1980 | Lukner . |
| 4,241,985 | 12/1980 | Globus et al. . |
| 4,326,775 | 4/1982 | King . |
| 4,395,093 | 7/1983 | Rosendahl et al. . |
| 4,429,957 | 2/1984 | King . |
| 4,463,380 | 7/1984 | Hooks, Jr. . |
| 4,484,801 | 11/1984 | Cox . |
| 4,518,898 | 5/1985 | Tarnowski et al. . |
| 4,549,208 | 10/1985 | Kamejima et al. . |
| 4,561,733 | 12/1985 | Kreischer . |
| 4,566,763 | 1/1986 | Greguss . |
| 4,578,682 | 3/1986 | Hooper et al. . |
| 4,593,982 | 6/1986 | Rosset . |
| 4,602,857 | 7/1986 | Woltz et al. . |
| 4,656,506 | 4/1987 | Ritchey . |
| 4,661,855 | 4/1987 | Gulck . |
| 4,670,648 | 6/1987 | Hall et al. . |
| 4,728,839 | 3/1988 | Coughlan et al. . |
| 4,736,436 | 4/1988 | Yasukawa et al. . |
| 4,742,390 | 5/1988 | Francke et al. . |
| 4,751,660 | 6/1988 | Hedley . |
| 4,754,269 | 6/1988 | Kishi et al. . |
| 4,761,641 | 8/1988 | Schreiber . |
| 4,772,942 | 9/1988 | Tuck . |
| 4,797,942 | 1/1989 | Burt et al. . |
| 4,807,158 | 2/1989 | Blanton et al. . |
| 4,835,532 | 5/1989 | Fant . |
| 4,858,002 | 8/1989 | Zobel . |
| 4,858,149 | 8/1989 | Quarendon . |
| 4,864,335 | 9/1989 | Corrales . |
| 4,868,682 | 9/1989 | Shimizu et al. . |
| 4,899,293 | 2/1990 | Dawson et al. . |
| 4,901,140 | 2/1990 | Lang et al. . |
| 4,907,084 | 3/1990 | Nagafusa . |
| 4,908,874 | 3/1990 | Gabriel . |
| 4,918,473 | 4/1990 | Blackshear . |
| 4,924,094 | 5/1990 | Moore . |
| 4,943,821 | 7/1990 | Gelphman et al. . |
| 4,943,851 | 7/1990 | Lang et al. . |
| 4,945,367 | 7/1990 | Blackshear . |
| 4,965,844 | 10/1990 | Oka et al. . |
| 4,974,072 | 11/1990 | Hasegawa . |
| 4,985,762 | 1/1991 | Smith . |
| 4,991,020 | 2/1991 | Zwirn . |
| 5,005,083 | 4/1991 | Grage et al. . |
| 5,020,114 | 5/1991 | Fujioka et al. . |
| 5,021,813 | 6/1991 | Corrales . |
| 5,023,725 | 6/1991 | McCutchen . |
| 5,038,225 | 8/1991 | Maeshima . |
| 5,040,055 | 8/1991 | Smith . |
| 5,048,102 | 9/1991 | Tararine . |
| 5,067,019 | 11/1991 | Juday et al. . |
| 5,068,735 | 11/1991 | Tuchiya et al. . |
| 5,077,609 | 12/1991 | Manephe . |
| 5,083,389 | 1/1992 | Alperin . |
| 5,097,325 | 3/1992 | Dill . |
| 5,115,266 | 5/1992 | Troje . |
| 5,130,794 | 7/1992 | Ritchey . |
| 5,142,354 | 8/1992 | Suzuki et al. . |
| 5,153,716 | 10/1992 | Smith . |
| 5,157,491 | 10/1992 | Kassatly . |
| 5,166,878 | 11/1992 | Poelstra . |
| 5,173,948 | 12/1992 | Blackham et al. . |
| 5,175,808 | 12/1992 | Sayre . |
| 5,185,667 | 2/1993 | Zimmermann . |
| 5,187,571 | 2/1993 | Braun et al. . |
| 5,189,528 | 2/1993 | Takashima et al. . |
| 5,200,818 | 4/1993 | Neta et al. . |
| 5,231,673 | 7/1993 | Elenga . |
| 5,259,584 | 11/1993 | Wainwright . |
| 5,262,852 | 11/1993 | Eouzan et al. . |
| 5,262,867 | 11/1993 | Kojima . |
| 5,280,540 | 1/1994 | Addeo et al. . |
| 5,289,312 | 2/1994 | Hashimoto et al. . |
| 5,305,035 | 4/1994 | Schonherr et al. . |
| 5,311,572 | 5/1994 | Freides et al. . |
| 5,313,306 | 5/1994 | Kuban et al. . |
| 5,315,331 | 5/1994 | Ohshita . |
| 5,341,218 | 8/1994 | Kaneko et al. . |
| 5,359,363 | 10/1994 | Kuban et al. . |
| 5,384,588 | 1/1995 | Martin et al. . |
| 5,396,583 | 3/1995 | Chen et al. . |
| 5,422,987 | 6/1995 | Yamada . |
| 5,432,871 | 7/1995 | Novik . |
| 5,444,476 | 8/1995 | Conway . |
| 5,446,833 | 8/1995 | Miller et al. . |
| 5,452,450 | 9/1995 | Delory . |
| 5,473,474 | 12/1995 | Powell . |
| 5,479,203 | 12/1995 | Kawai et al. . |
| 5,490,239 | 2/1996 | Myers . |
| 5,495,576 | 2/1996 | Ritchey . |
| 5,508,734 | 4/1996 | Baker et al. . |
| 5,530,650 | 6/1996 | Bifero et al. . |
| 5,539,483 | 7/1996 | Nalwa . |
| 5,550,646 | 8/1996 | Hassen et al. . |
| 5,563,650 | 10/1996 | Poelstra . |
| 5,601,353 | 2/1997 | Naimark et al. . |
| 5,606,365 | 2/1997 | Maurinus et al. . |
| 5,610,391 | 3/1997 | Ringlien . |
| 5,612,533 | 3/1997 | Judd et al. . |
| 5,627,675 | 5/1997 | Davis et al. . |
| 5,631,778 | 5/1997 | Powell . |
| 5,633,924 | 5/1997 | Kaish et al. . |
| 5,649,032 | * 7/1997 | Burt et al. ............................ 382/284 |
| 5,682,511 | 10/1997 | Sposato et al. . |
| 5,686,957 | 11/1997 | Baker et al. . |
| 5,714,997 | 2/1998 | Anderson et al. . |
| 5,729,471 | 3/1998 | Jain et al. . |
| 5,748,194 | 5/1998 | Chen . |
| 5,760,826 | 6/1998 | Nayer . |
| 5,761,416 | 6/1998 | Mandal et al. . |
| 5,764,276 | 6/1998 | Martin et al. . |
| 5,796,426 | 8/1998 | Gullichsen et al. . |
| 5,835,723 | * 11/1998 | Andrews et al. ..................... 370/252 |
| 5,841,589 | 11/1998 | Davis et al. . |
| 5,844,520 | 12/1998 | Guppy et al. . |
| 5,850,352 | 12/1998 | Moezzi et al. . |
| 5,854,713 | 12/1998 | Kuroda et al. . |
| 5,877,801 | 3/1999 | Martin et al. ........................ 348/36 |
| 5,903,319 | 5/1999 | Busko et al. . |
| 5,905,819 | * 5/1999 | Daly ..................................... 382/284 |
| 5,920,337 | 7/1999 | Glassman et al. . |
| 5,990,941 | 11/1999 | Jackson et al. . |
| 6,002,430 | 12/1999 | McCall et al. . |
| 6,034,716 | 6/1998 | Whiting et al. . |
| 6,043,837 | 3/2000 | Driscoll, Jr. et al. . |

OTHER PUBLICATIONS

Defendant IPI's Composit Exhibit List, Civil Action of Interactive Pictures Corporation, F/K/A Omniview, Inc. v. Infinite Pictures, Inc. and Bill Tillman, Case No. 3–96–849. Filed: Jan. 5, 1998, in U.S.D.C., Eastern District Tenessee, Pages: 20.*

Plaintiff's Rule 26(a)(3) Disclosures, Civil Action of Interactive Pictures Corporation, F/K/A Omniview, Inc. v. Infinite Pictures, Inc. and Bill Tillman, Case No. 3–96–849; 31 Pages. Filed: Dec. 8, 1997, in U.S.D.C., Eastern District of Tenessee.*

Plaintiff's Supplemental Trial Exhibit List, Civil Action of Interactive Pictures Corporation, F/K/A Omniview, Inc. v. Infinite Pictures, Inc. and Bill Tillman, Case No. 3–96–849; 41 Pages. Filed Jan. 2, 1998, in U.S.D.C., Eastern District of Tenessee.*

Ripley G. David, "DVI—A Digital Multimedia Technology". Communication of the ACM, Jul. 1989. vol. 32. No. 07. pp. 811–820.*

Cnoe M. and Kuno Y., "Digital Processing CF Images Taken by Fish–Eye Lens". 1982. IEEE. pp. 105–108.*

Hamit, F., "Near–Fisheye CCD Camera Broadens View for Imaging". Advanced Imaging. Mar. 1993. pp. 50–52.*

Dixon, D., Golin, S., and Hasfield, I., "DVI Video/Graphics". Computer Graphics World reprinted from the Jul. 1987 edition of Computer Graphics World. Pages: 04.*

Upstill, Steve. "Building Stronger Images". UNIX Review. Oct. 1988. vol. 06. No. 10. pp. 63–73.*

Greene, N., "Environment Mapping and Other Applications of the World Projections." Computer Graphics and Applications Nov. 1986. IEEE Computer Society. vol. 6, No. 11. pp. 21–29.

Hechbert P., "The PMAT and Poly User's Manual". Computer Graphics Lab. N.Y.I.T., Feb. 18, 1983. pp. 1–29.

Heckbert, P., Fundamentals of Textured Mapping and Image Warping. Master Thesis. Pages 86. Dated: Jun. 17, 1989.

Rebiai,M., Mansouri,S., Pinson,F., and Tichit, B., "Image Distortion From Zoom Lenses: Modeling and Digital Correction". International Broadcasting Convention. IEEE. Dated: Jul. 1992.

Charles Jeffery, R., "All–Sky Reflector with "Invisible" Camera Support". Images from 1988 RTMC Proceedings. pp. 79–80.

Roger W. Sinnott, "Scientific Library Gleaning for ATMs". Sky & Telescope. Aug. 1986. Pages: 186.

Charles et al., "How to Build and Use an All–Sky Camera." Astronomy. Apr. 1987. pp. 64–70.

Deutsch, Cludia H., "One Camera That Offers Many Views". The New York Times.

Johnson, Colin R., "Imaging System Sees All". Electronic Engineering Times. Dec. 25, 1996. pp. 1&98.

"Panospheric Camera Expands Horizon". Pages: 01.

"Panoshperic Camera Developed at Carnegie Mellon Expands Horizon". Pages: 01.

Castleman, K., "Digital Image Processing". Prentice Hall. 1979. pp. 110–135, 383–400,408.

Castleman, K., "Digital Image Processing". Prentice Hall. 1996, pp. 125–127, 140–141.

Shah, S., A Simple Calibration Procedure For Fish–Eye (High Distortion) Lens. IEEE. 1994. pp. 3422–3427.

"Gnomonic Projection". Map Projections—A Working Manual. pp. 164–168.

Greene, N., and Heckbert, P., "Creating Raster Omnimax Images From Multiple Perspective Views Using The Elliptical Weighted Average Filter". IEEE. 1986. pp. 21–27.

Fant, K., "A Nonaliasing, Real–Time Spatial Formation Technique". IEEE. 1986. pp. 71–80.

Greene, William B., "Qualitative Image Processing Techniques". Digital Image Processing, A Systems Approach. $2^{nd}$ Edition. 1989. Van Nostrand Reinhold. pp. 92–112.

Wolberg, George. Digital Image Warping (Introduction), 1990. IEEE Computer Society Press, Pages: 2.

Fu, K.S. et al., "Low–Level Vision". Robotics: Control, Sensing, Vision, and Intelligence. 1987. McGraw Hill Inc., pp. 313–315.

Carlbom, Ingrid et al. "Planner Geometric Projections and Viewing Transformations". Computing Surveys. Vol. 10, No. 4. Dec. 1978. pp. 465–502.

Anderson, R.L., et al., "Omnidirectional Real time Imaging Using Digital Restoration". High Speed Photography SPIE. vol. 348. San Diego, CA. 1982. pp. 807–814.

Laikin, Milton. "Wide Angle Lens System". 1980. International Design Conference (OSA). SPIE. vol. 237. 1980. pp. 530–532, 815–816.

Shah, Shisir et al., "Depth Estimation using Fish–Eye Lenses". IEEE. Department Of Electrical and Computer Engineering. University of Texas. 1994. pp. 740–744.

Tsai, Roger Y., "A Versatile Camera Calibration Technique for High Accuracy 3–D Machine Vision Using Off–the–Shelf TV Cameras and Lenses". IEEE Journals of Robotics and Automation. vol. RA–3. No. 04. Aug. 1987. pp. 323–344.

Chang, Yuh–Lin et al., "Calibrating a Mobile Camera's Parameters". Pattern Recognition. vol. 26, No. 01. Dated: 1983. pp. 75–88.

Weng, Juyang. "Camera Calibration With Distortion Models and Accuracy". IEEE. Transactions On Pattern Analysis and Machine Intelligence. vol. 14, No. 10. Oct. 1992. pp. 965–980.

Lenz, Reimer K. et al., "Techniques for Calibration of the Scale Factor and Image Center for High Accuracy 3–D Machine Vision Metrology". IEEE. Transaction on Pattern Analysis and Machine Intelligence. vol. 05. No. 05. Sep. 1988. pp. 713–720.

Nomura, Yoshihiko, et al., "A Simple Calibration Algorithm for High–Distortion Lens Camera". IEEE. Transaction on Pattern Analysis and Intelligence Machine. vol. 14. No. 11. Nov. 1992. pp. 1095–1099.

International Broadcasting Convention Venue RAI Congress And Exhibition Centre, Amersterdam, The Netherlands. Jul. 3–7, 1992. Pages:06, including the title page.

Telerobotics International, Inc. "Optimizing The Camera And Positioning System For Telerobotic Workcite Viewing".

Miyamoto, K., "Fish Eye Lens". JOSA. vol. 54. pp. 1060–1061. Dated: Aug. 1964.

Plaintiff's Rule 26(a)(3) Disclosures. Civil Action of Interactive Pictures Corporation, F/K/A Omniview, Inc. V. Infinite Pictures, Inc. and Bill Tillman, Case No. 3–96–849. Filed: Dec. 8, 1997 in U.S.D.C. Eastern District of Tennessee. Pages: 31.

Defendant's IPI's Composite Exhibit List, Civil Action of Interactive Pictures Corporation, F/K/A Omniview, Inc. v. Infinite Pictures, Inc. and Bill Tillman. Case No. 3–96–849. Filed: Jan. 5, 1998 in U.S.D.C., Eastern District Of Tennessee. Pages: 20.

Baltes, M., "Bevet D'Intervention". Ref. No.: N 1.234.341.

Verity, John W. (edited by): Information Processing. Business Week. p. 134E. Dated: Jul. 13, 1992.

Marbach, William D. (edited by): Developments To Watch. Business Week. p. 83. Dated: Sep. 26, 1988.

Lu Carnevale, Mary. Video Camera Puts The Viewer in Control. Wall Street Journal. Dated: Nov. 25, 1992.

Popular Science. Electronic Panning Camera System. pp. 36–37. Dated Sep. 1992.

Tulloch, Martha. "New Video Camera . . . " Photonics Spectra. pp. 18–20. Dated: Oct. 1992.

Fisher, Timothy E., A Programmable Video Image Remapper. SPIE> vol. 938. pp. 122–128. Dated: 1988.

Lippman, Andrew. Movie–Map: An Application Of The Optical Videodisc To Computer Graphics. Pages: 43. Dated: 1980.

Yelick, Steven. Anamorphic Image Processing. pp. 1–37, Including Acknowledgement Page. Dated: 1980.

Chen, Schenchang Eric. Quick Time VR—An Image–Based Approach To Virtual Environment Navigation. Pages: 39. Dated: 1995.

* cited by examiner

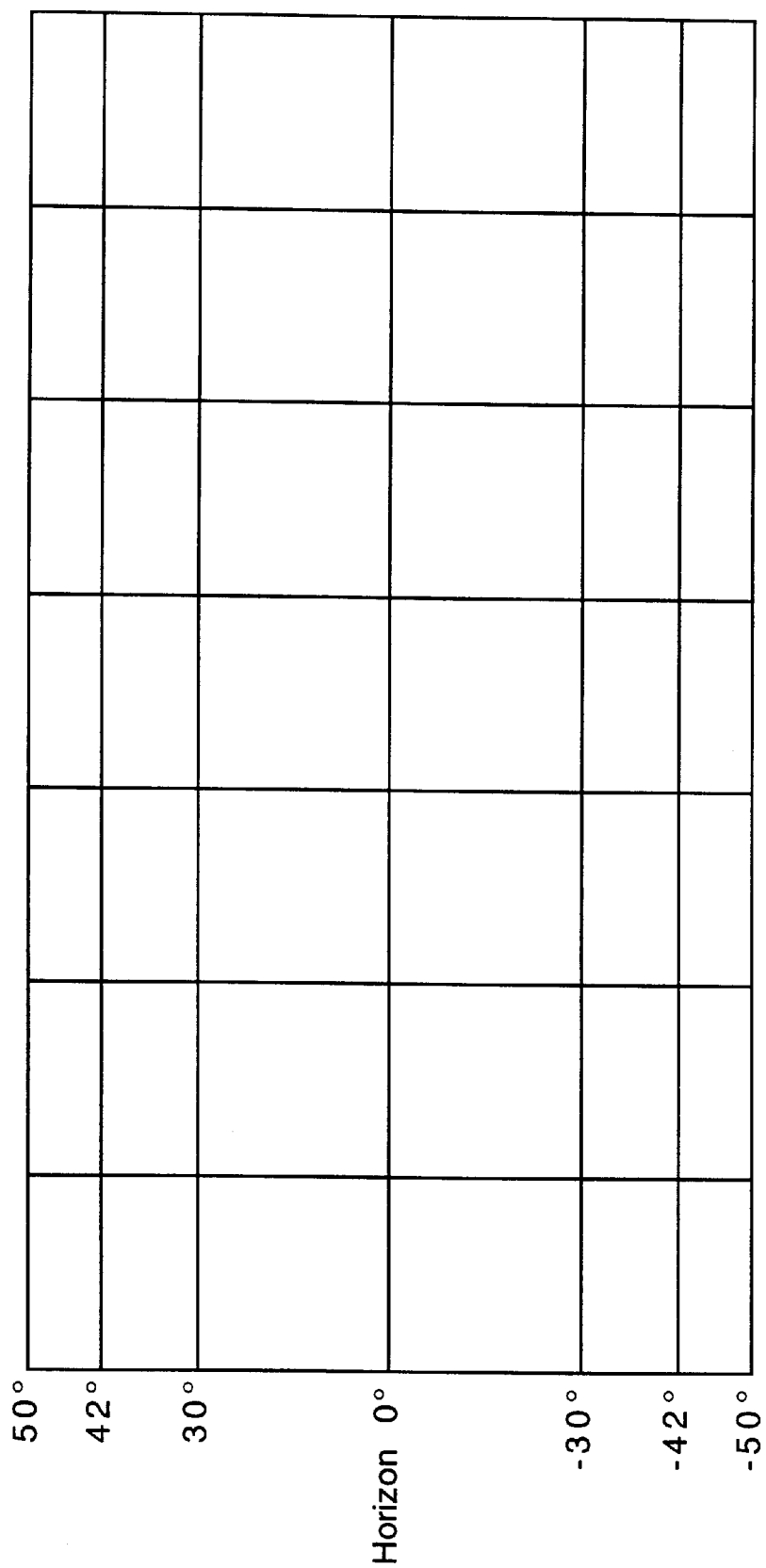

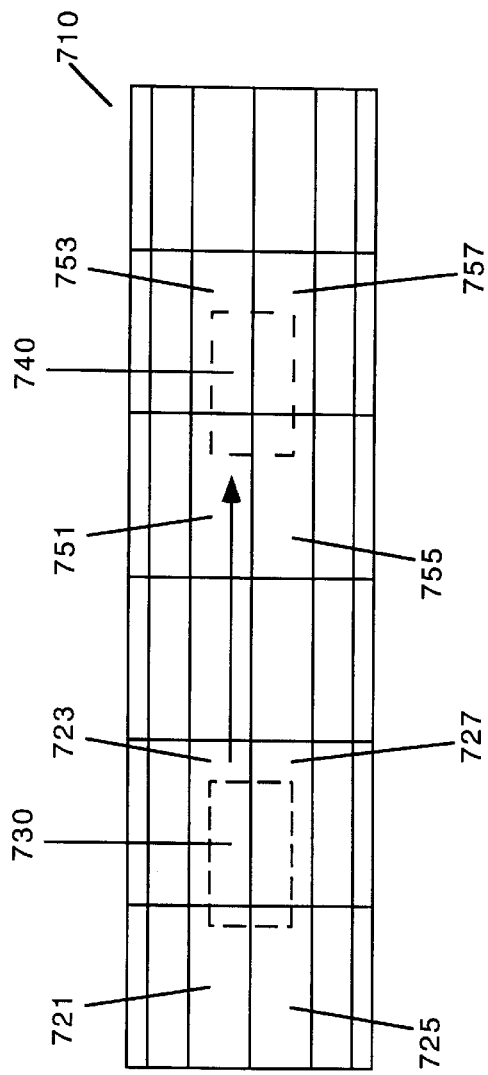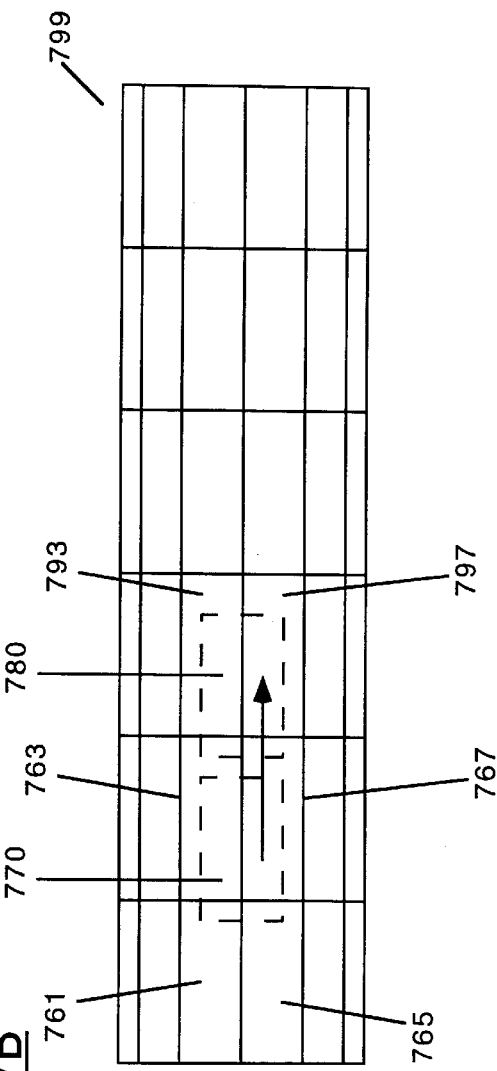

METHOD AND APPARATUS FOR ELECTRONICALLY DISTRIBUTING MOTION PANORAMIC IMAGES

FIELD OF THE INVENTION

The present invention relates to the field of image processing and data distribution. In particular the present invention discloses methods and apparatus for processing, transmitting, and post-processing panoramic image information.

BACKGROUND OF THE INVENTION

Most cameras only record a view within a small viewing angle. Thus, a typical conventional camera only captures an image in the direction that the camera is aimed. Such conventional cameras force viewers to look only at what the camera operator chooses to focus on.

Panoramic cameras capture a much wider field of field. A panoramic camera constructed using an optical "fish-eye" lens may capture at most a 210 degree field of view. A panoramic camera constructed with a catadioptric lens captures a full 360 degree panoramic image. With a large panoramic field of view, individual panoramic image viewers can decide what they will focus on.

Conventional images are often delivered by electronic means. For example, television and the Internet deliver conventional images across wired and wireless electronic media. However, there are no standard means of delivering panoramic images electronically. Since panoramic images are so large, it is difficult to deliver panoramic images using conventional image transmission techniques. To further compound the problem, motion panoramic images require a very high bandwidth channel for electronic distribution. Thus, it would be desirable to have an electronic distribution system that efficiently distributes motion panoramic image information.

SUMMARY OF THE INVENTION

The present invention discloses an electronic image distribution apparatus for distributing motion panoramic images. The main portion of the apparatus is a motion panoramic image server that has a source of motion panoramic images. The source of panoramic image frames may be a motion panoramic image playback device or a connection to a motion panoramic camera system. The motion panoramic image server transforms the panoramic image frames into an intermediate planar representation that is more conducive for electronic transmission. The motion panoramic image server then transmits the motion panoramic images to client systems. The present invention proposes two different transmission systems.

A first panoramic image transmission system divides the intermediate planar representation into individual tiles. Individual client systems then request the individual tiles needed to construct a view into the panoramic image on the client system. The server then transmits the requested tiles to the client system. A highly compressed full panoramic image is transmitted occasionally to handle a situation where a user has moved the view into the panoramic image to a position where the client system does not have the necessary tiles for creating a view.

A second panoramic image transmission system also divides the intermediate planar representation into individual tiles. However, the second panoramic image transmission system then transmits the individual tiles on different multicast channels. Client systems then subscribe the multicast channels needed to render an image in the direction of a desired view.

Other objects, features and advantages of present invention will be apparent from the company drawings and from the following detailed description.

BRIEF DESCRIPTION OF THE DRAWINGS

The objects, features and advantages of the present invention will be apparent to one skilled in the art, in view of the following detailed description in which:

FIG. 5C illustrates a panoramic image frame in a cylindrical intermediate planar representation that has been divided into individual tiles or a spherical intermediate planar representation that has been adjusted and divided into tiles.

FIG. 7A illustrates a view within a panoramic image frame intermediate planar representation that has suddenly shifted by a large angular value.

FIG. 7B illustrates a view within a panoramic image frame intermediate planar representation that has suddenly shifted by a small angular value.

DETAILED DESCRIPTION OF THE PREFERRED EMBODIMENT

A method and apparatus for compressing and distributing motion panoramic images is disclosed. In the following description, for purposes of explanation, specific nomenclature is set forth to provide a thorough understanding of the present invention. However, it will be apparent to one skilled in the art that these specific details are not required in order to practice the present invention. For example, the present invention's method of distributing panoramic images has been described with reference to the Internet. However, other types of digital information distribution systems such as private data networks and satellite systems may be used with the teachings of the present invention.

The Basic Panoramic Camera Design

Figure 1:
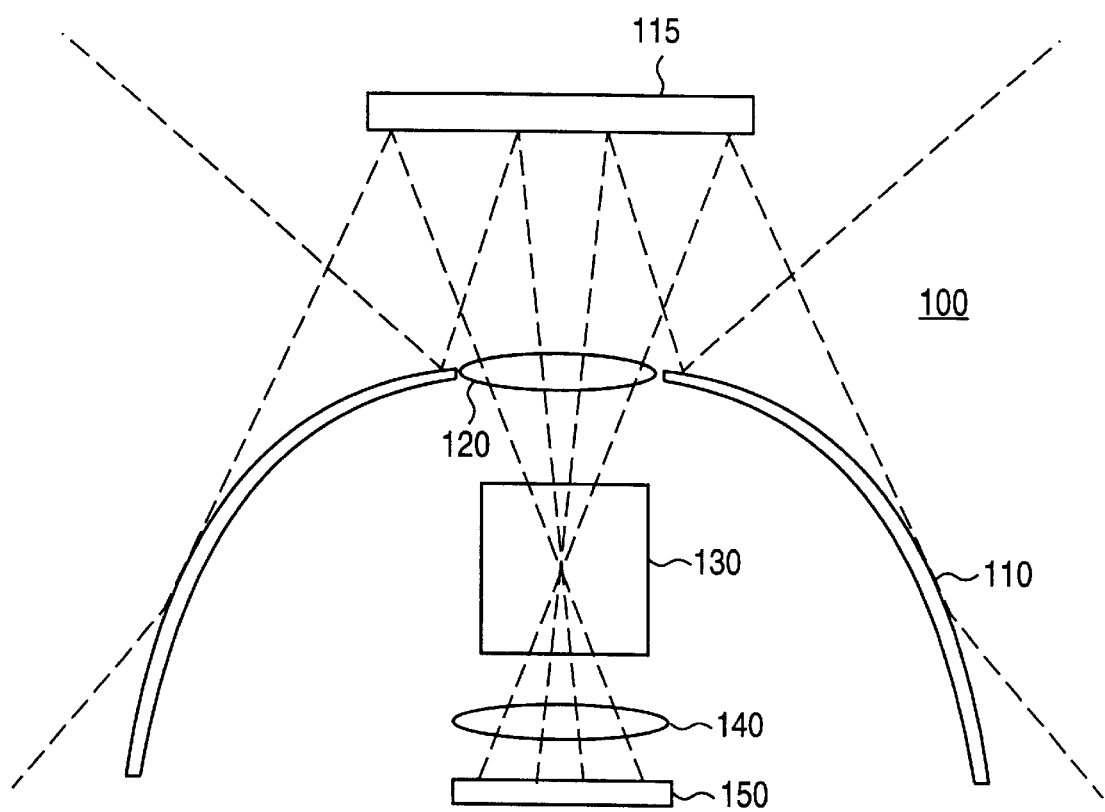
FIG. 1 illustrates one embodiment of a panoramic camera system that creates annular images.

FIG. 1 illustrates an embodiment of one possible 360 degree panoramic camera system. The image capture mechanism 150 of the panoramic camera system captures an angular image of the surrounding panorama that is reflected off the main reflector 110. More details about the panoramic camera system of FIG. 1 can be found in the copending patent application entitled "Panoramic Camera", filed Jun. 11, 1997 and having Ser. No. 08/872,525 which is hereby incorporated by reference.

Figure 2A:
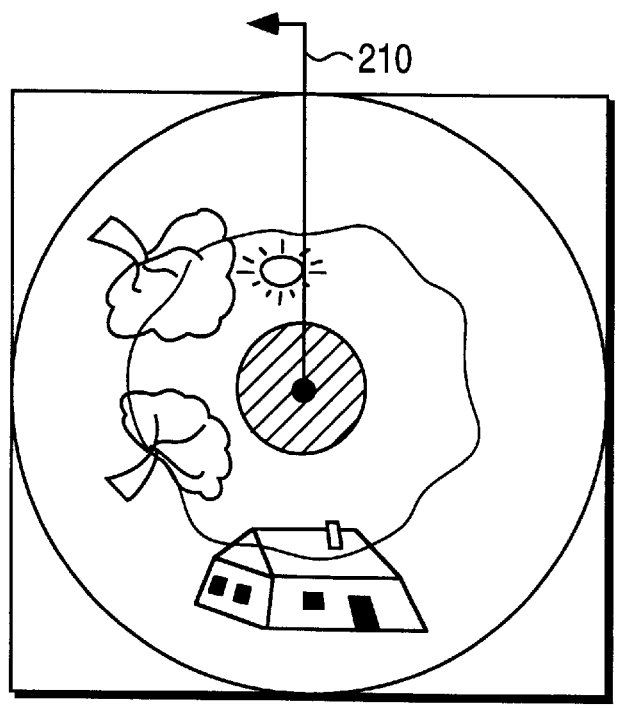
FIG. 2a illustrates an annular image that is recorded by the panoramic camera system of FIG. 1.
Figure 2B:
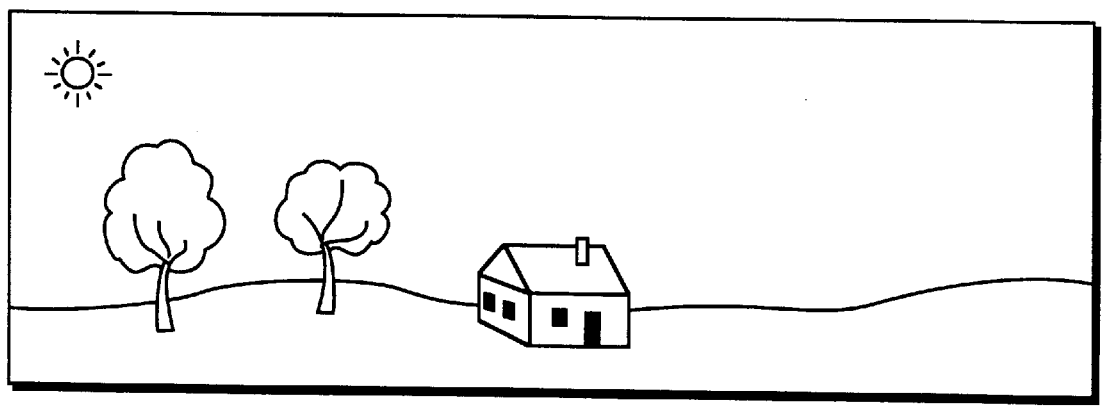
FIG. 2b illustrates how the annular image of FIG. 2a appears after it has been unwrapped by geometrical transformation software.

FIG. 2a illustrates an example of a panoramic image captured as an annular image. As illustrated in FIG. 2a, the surrounding panorama is distorted by the main reflector having radial symmetry such that the surrounding represented as a two-dimensional annular image. In one embodiment, the shape of the main reflector transforms the standard rectangular coordinate system of the image into a polar coordinate system. To view the panoramic image captured as a two-dimensional annular image, the annular image may be unwrapped to create an intermediate planar representation. The unwrapping is performed using a geometric transformation operation. FIG. 2b illustrates how the annular image of FIG. 2b appears after the images are geometrically transformed from the annular representation to a rectangular intermediate planar representation.

Figure 3:
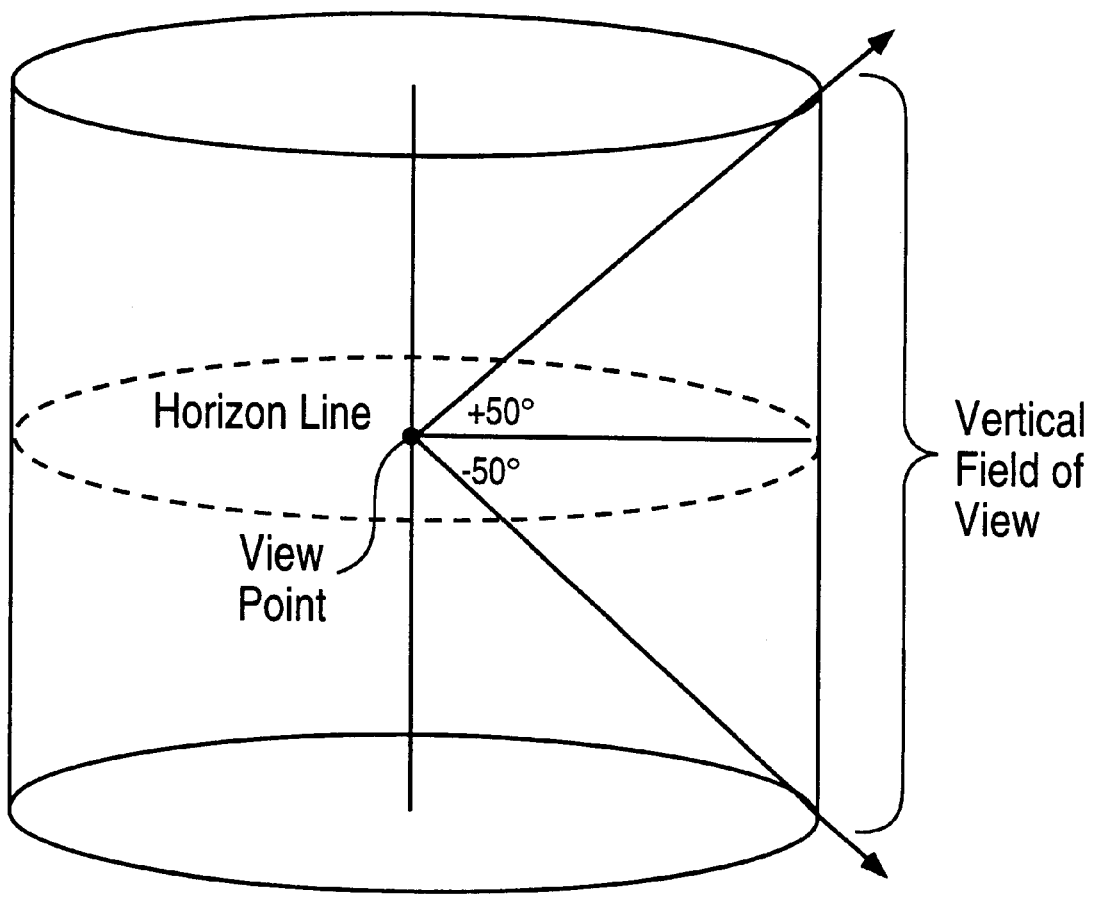
FIG. 3 illustrates the 360 degree band that the panoramic camera system of FIG. 1 captures and FIG. 3 also illustrates a cylindrical projection data format.

The panoramic camera system of FIG. 1 captures an entire 360 degree image of the surrounding horizon as illustrated in FIG. 3. The panoramic camera system captures a panoramic image that includes objects as low as 50 degrees below the horizon and objects as high as 50 degrees above the horizon. However, alternate panoramic camera systems may capture a full spherical panoramic view, a partial 180 degree hemispherical view, or any other panoramic view. Furthermore, a panoramic image may be constructed by combining a mosaic of convention images captured with convention camera systems. For example, eight convention cameras can be used to capture images from eight different directions. Those images are then combined together to create a single panoramic image.

A Motion Panoramic Image Capture System

Figure 4:
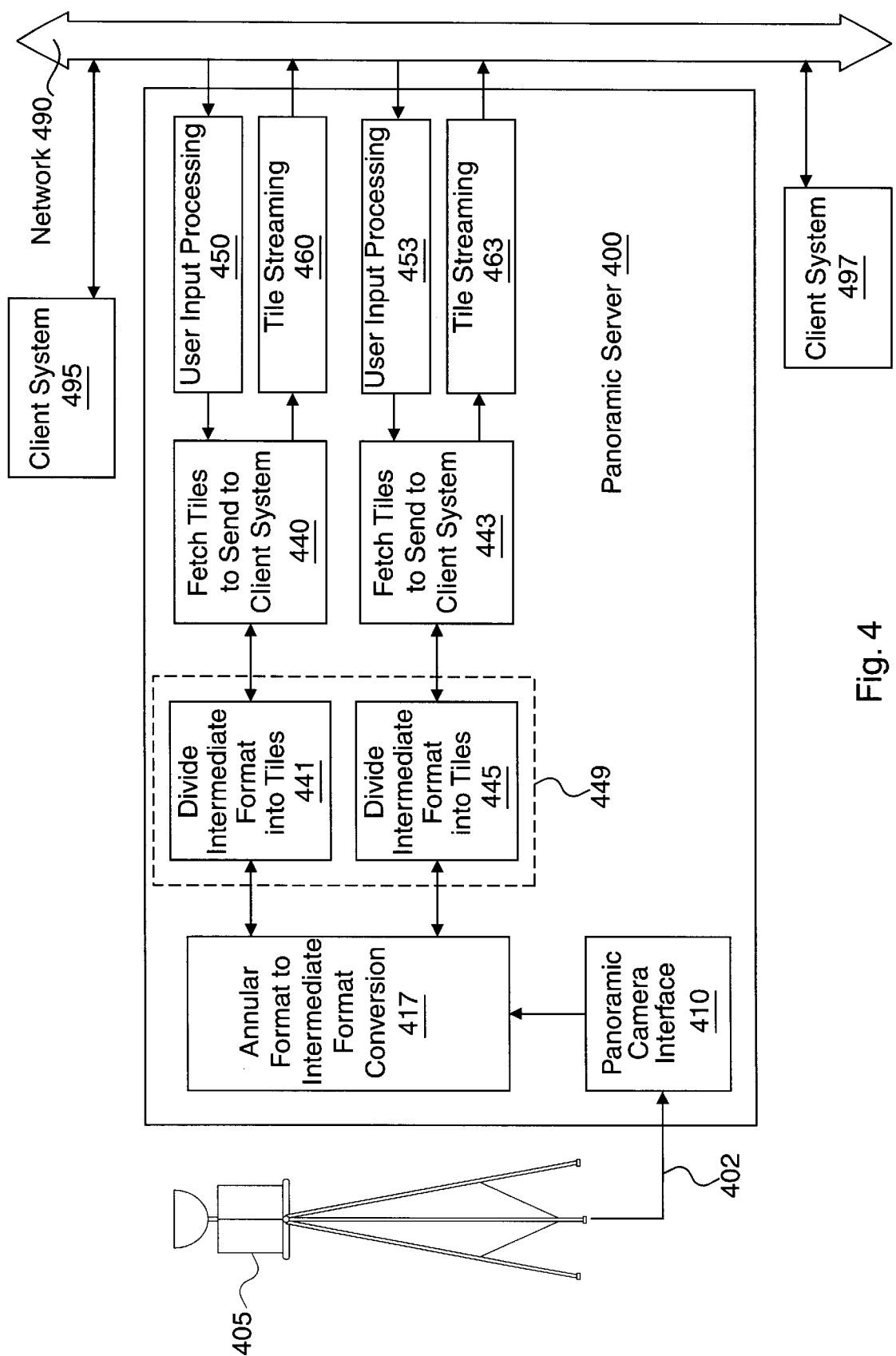
FIG. 4 illustrates a networked computer systems arrangement used to distribute motion panoramic images captured by the panoramic camera system FIG. 1 from a panoramic image server to client systems.

When the image capture mechanism 150 of the panoramic camera of FIG. 1 is a motion image capture mechanism such as a charged coupled device (CCD) or a film-based motion picture image capture system, then it is possible to capture a series of panoramic annular images. The series of panoramic annular images can be used to generate a motion panoramic display. FIG. 4 illustrates one possible embodiment of an electronic motion panoramic image capture system.

Referring to FIG. 4, a panoramic camera system 405 captures a series of panoramic annular image frames with an electronic image capture mechanism. For example, the electronic image capture mechanism can be a charged coupled device image capture mechanism or CMOS image sensor that generates digitized panoramic annular image frames. The panoramic annular image frames are transmitted from panoramic camera system 405 to a panoramic image server 400 across a high bandwidth communication link 402. The communication link must be high bandwidth since each panoramic annular image frame contains a very large amount of information and to provide a flicker-free motion image, several panoramic images must be transmitted each second.

Alternate embodiments of motion panoramic image capture systems can also be used. For example, a motion panoramic capture system may be created with two motion picture camera systems pointing in opposite directions wherein each motion picture camera system is equipped with a fisheye lens that captures at least a 180 degree hemispherical field of view. In such a panoramic image system, two distorted fisheye images from each hemispherical view would need to be "stitched" together in to created a single panoramic image.

A First Motion Panoramic Image Distribution System Embodiment

As previously set forth, the full panoramic annular image frames generated by the panoramic camera system (such as panoramic camera system 405 of FIG. 4) are so large that a very high bandwidth link is needed to transmit full motion images to a recipient. Such high bandwidth links are rare and expensive. Thus, for mass distribution of panoramic imagery, more bandwidth efficient methods of distributing panoramic images are needed.

The present invention introduces two different methods of distributing motion panoramic images. A first method divides panoramic images into tiles and transmits only the tiles needed to construct a desired image. A second method, described in a later section, divides panoramic images into individual tiles and then transmits all the tiles on different multicast channels.

The Selective Tile Transmission System

To efficiently transmit a panoramic image, the present invention first proposes a selective tile transmission system. In the selective tile transmission system, a server computer system divides each panoramic frame into tiles. The tile size and shape are preferably selected in such a manner that is dependent upon a coordinate system used by the format used to transmit the tiles. Then, the tiles needed to construct an image on a client computer system are transmitted from the server system to individual clients.

In a preferred embodiment, the server system transforms each incoming panoramic image frame into an intermediate planar representation. This transformation step is not necessary but provides certain advantages. The selective tile transmission system will be described with reference to a system that performs this transformation in FIGS. 4, 5, 6, 7, 8 and 9.

Referring to the particular embodiment of the selective transmission system illustrated in FIG. 4, a panoramic annular image transformation system 417 "unwraps" annular panoramic image frames into an intermediate planar representation. The intermediate planar representation is more convenient for generating images suitable for viewing. Specifically, the intermediate format should require fewer calculations to generate a final rectangular projection.

Figure 5A:
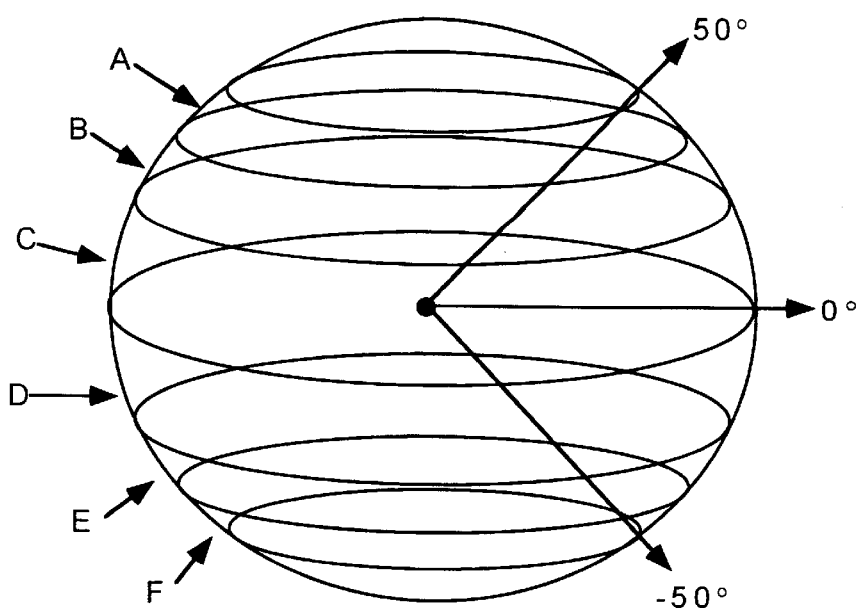
FIG. 5A illustrates a conceptual view of a spherical view captured by the panoramic camera system of FIG. 1.

In one embodiment, the incoming annular panoramic image data is geometrically transformed into a spherical coordinate system with a spherical projection representation. In such an embodiment, a single frame of the image data may be viewed with the Live Picture viewer from Live Picture, Inc. FIG. 5A conceptually illustrates a spherical data format wherein the view of the surroundings is projected onto a sphere surrounding a view point.

In another embodiment, the incoming annular panoramic image data is geometrically transformed into a cylindrical coordinate system in a cylindrical projection representation. An image transformed into a cylindrical coordinate system may be viewed with the QuickTime VR viewer created by Apple Computer, Inc. FIG. 3 conceptually illustrates a cylindrical data format wherein the view of the surroundings is projected onto a cylinder surrounding a view point.

After converting the panoramic image frames into an intermediate planar representation, the system of the present invention divides the intermediate planar representation into individual tiles. In the present invention, the size of the tiles are dependent upon the coordinate system of the intermediate planar representation. In such embodiments, the tiles may be spatially variant.

The size of the tiles may further be dependent upon the client system that will be displaying the panoramic image data. In such an embodiment, each client uses a different process (441 or 445) to divide intermediate planar representations into tiles since each client may use different client sizes. However, in a standardized embodiment, the size of the tiles are fixed such that a single process (illustrated as dotted box 449) may be used to divide an intermediate planar representation into individual tiles.

FIG. 5A illustrates a conceptual diagram of the spherically encoded intermediate planar representation. As illustrated in FIG. 5A, the spherically encoded intermediate planar representation represents the surrounding world as image data mapped onto a sphere. To divide and organize the data, the sphere is broken into individual bands on sphere A, B, C, D, E, and F. Note that the bands near the "equator" of the spherically encoded intermediate planar representation contain more data than the bands closer to the "poles."

Figure 5B:
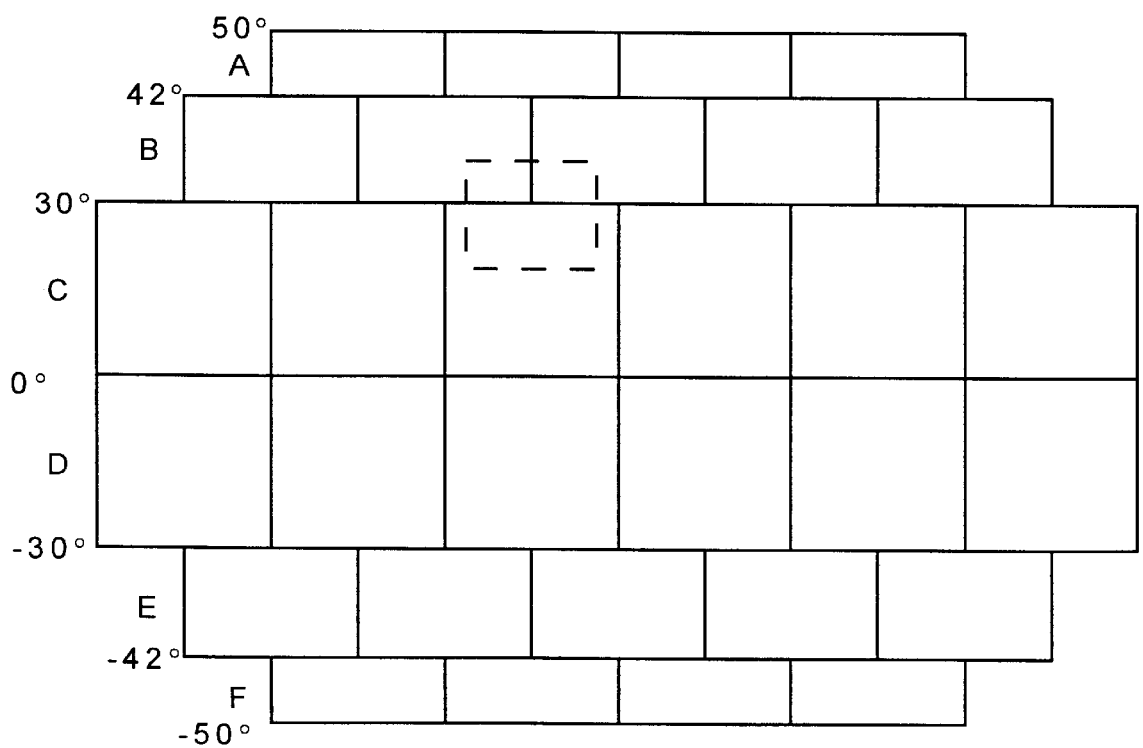
FIG. 5B illustrates a panoramic image frame in a spherical intermediate planar representation that has been unwrapped and divided into individual tiles.

In one embodiment of the present invention, the image data is represented individual bands that are divided into individual tiles as illustrated in FIG. 5B. Note that there will be fewer tiles in the bands from higher inclination angles. Alternatively, there will be the same number of tiles, but the tiles will contain data from a smaller yaw angles. If the data from the smaller yaw angles is increased, this type of intermediate data format can be graphically illustrated as show in FIG. 5C. Note that the graphical data representation of FIG. 5C also matches the cylindrical data format of FIG. 3. Although the data format of FIG. 5B may be used and provides certain advantages such as a more compact data format, this document will focus on the format of FIG. 5C since it simplifies the description.

Referring to the particular embodiment of FIGS. 5A, 5B, and 5C, a first row of tiles covers from the horizon line to thirty degrees above the horizon. A second row of tiles covers from thirty degrees above the horizon to forty-two degrees above the horizon. A third, top, row of tiles covers the band from forty-two degrees above the horizon to fifty degrees above the horizon. The same angular divisions are used to divide the space below the horizon. The row size divisions are nonlinear and widest at the horizon since users are usually most interested in views near the horizon. However, different angular divisions, such as linear angular divisions, may also be used.

After dividing each unwrapped panoramic image into tiles, a tile fetching program (440 and 443) fetches tiles for transmission to the client system. Ideally, the tile fetching program only selects the tiles needed to create a view on a client computer system. In a preferred embodiment, the client computer system determines which tiles are needed and sends a request that specifies which tiles should be selected. The fetched tiles are transmitted using a tile streaming program (460 and 463). By transmitting only the tiles needed to create a view on the client computer system, the system of the present invention limits the amount of information that must be transmitted from a panoramic image source server to a panoramic image client display.

Tile Tiering For Magnification

To accommodate several different magnification levels, several different sets of tile resolution may be created. For example, a low resolution "zoomed back" initial set of tiles may be used for panning around a panoramic image. The low resolution initial tiles would encompass a large angular view. When an interesting area of the panoramic image is selected, a higher resolution set of tiles could then be selected.

Figure 5D:
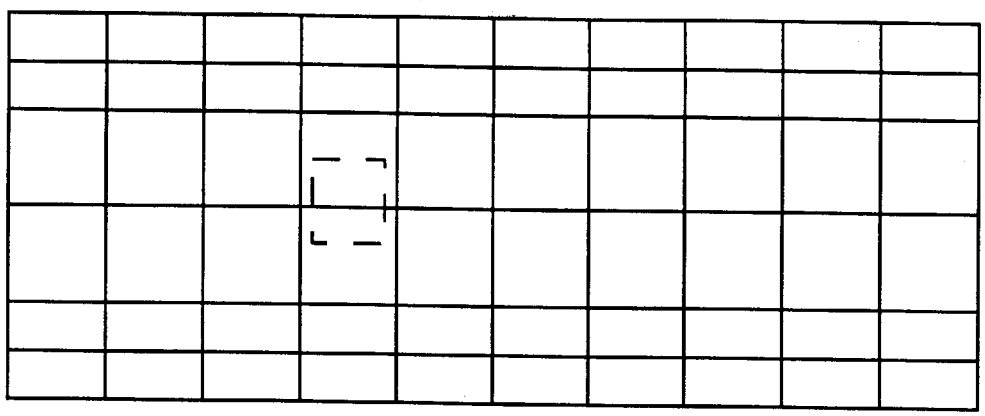
FIG. 5D illustrates a panoramic image frame in a low resolution intermediate planar representation that has been divided into individual tiles.
Figure 5E:
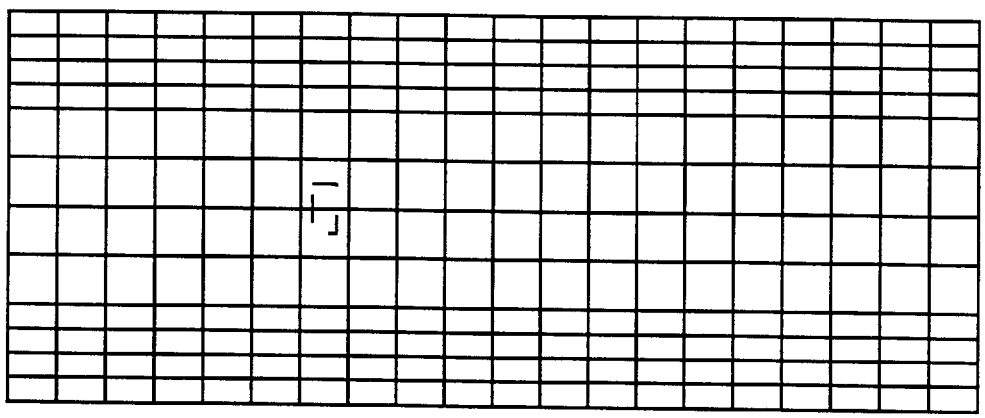
FIG. 5E illustrates a panoramic image frame in a medium resolution intermediate planar representation that has been divided into individual tiles.
Figure 5F:
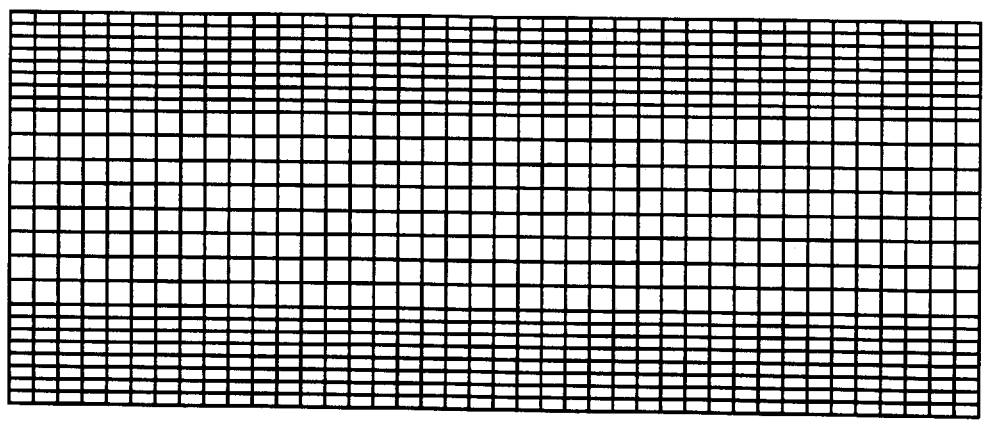
FIG. 5F illustrates a panoramic image frame in a high resolution intermediate planar representation that has been divided into individual tiles.

FIGS. 5D, 5E and 5F illustrate one possible embodiment where a panoramic image space has been divided into three tiers of magnification. An initial "zoomed back" tile magnification intermediate planar representation is presented in FIG. 5D. The lower resolution intermediate planar representation of FIG. 5D is used first. When a user wishes to see a portion of a view in greater detail, the client software "zooms in" by fetching tiles from the next higher resolution intermediate planar representation displayed in FIG. 5E. If even greater resolution is needed, the client software "zooms in" further by fetching tiles from FIG. 5F. In one embodiment, the pixel resolution of the individual tiles of FIGS. 5D, 5E and 5F is the same such that the individual tiles take up the same amount of screen space but provide successively greater resolution.

Tiling without Transformation

As stated in the beginning of this section, the initial panoramic image frames need not be transformed into an intermediate planar representation before division into individual tiles. The intermediate planar representation transformation is usually performed since the transformation is used to put the image into a format that can be used to quickly generate an image for display with minimal processing. However, the raw panoramic image frames may immediately be divided into tiles and transmitted.

Figure 5G:
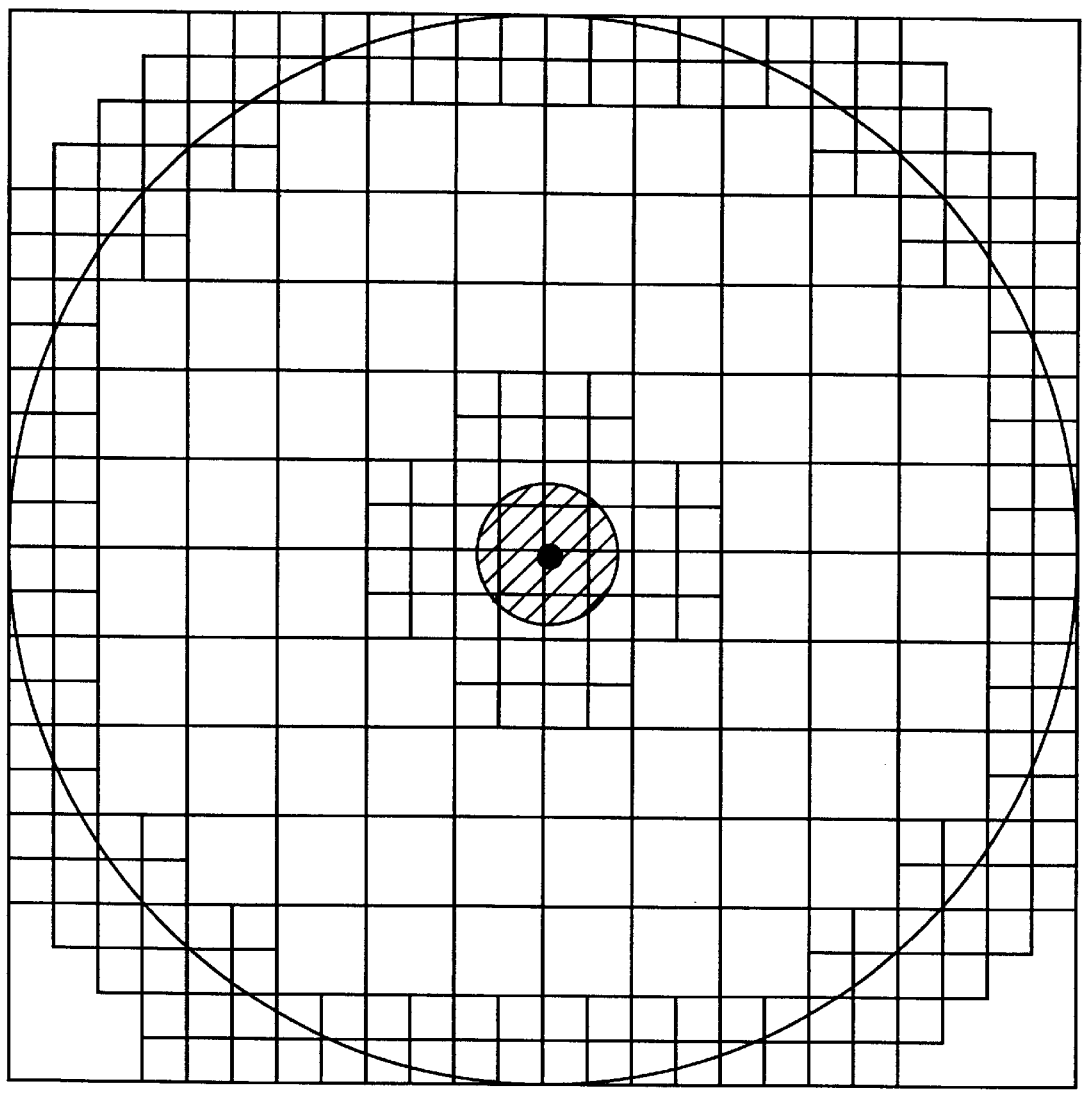
FIG. 5G illustrates a panoramic annular image frame that has been divided into spatially variant tiles.

For example, FIG. 5G illustrates a raw panoramic annular image frame from the panoramic camera system of FIG. 1.

Before transmitting, the raw panoramic annular image is divided into tiles. In the embodiment of FIG. 5G, the raw panoramic annular image is divided into square tiles that are small near the center since a small tile covers a wide image area in the annular format. The middle part of the annular disk is divided into larger tiles. The outside of the annular disk is divided into smaller tiles since a narrow strip of tiles is needed when constructing a view that uses information from the edge of the annular disk. Thus, the tiles are spatially variant.

Tile Positional Selection

Figure 6A:
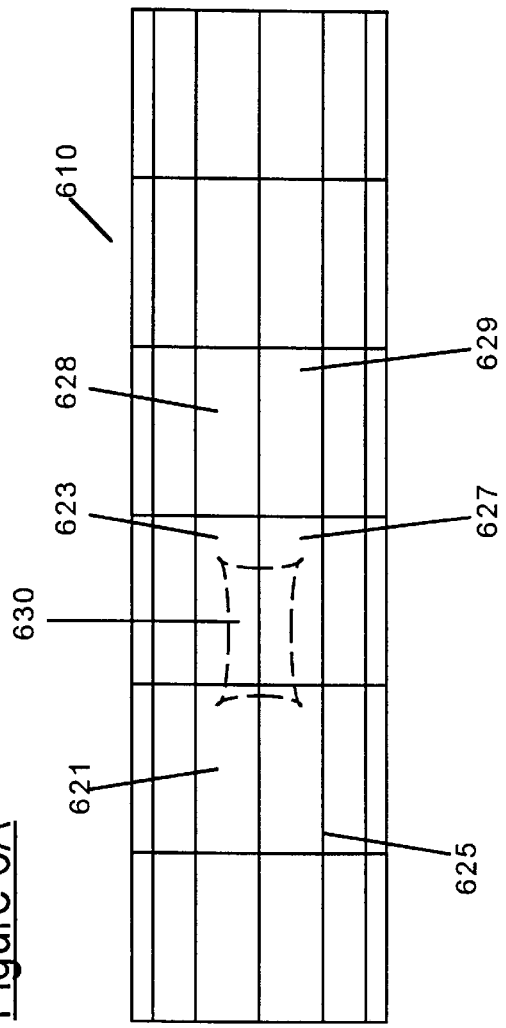
FIG. 6A illustrates a view within a panoramic image frame in an intermediate planar representation.
Figure 6B:
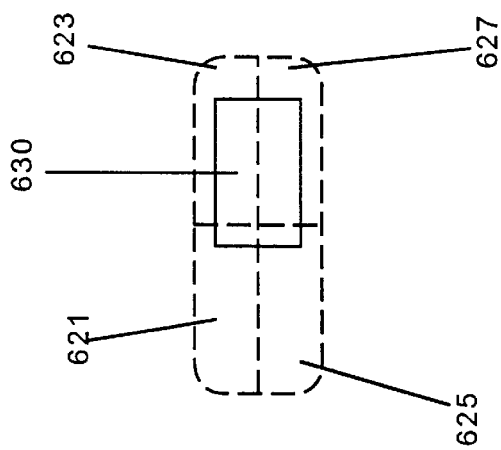
FIG. 6B illustrates four tiles from FIG. 6A transmitted to construct a view within a client system.

FIG. 6A illustrates an example of a client system view into a panoramic image. Specifically, client view 630 represents a view into an unwrapped panoramic image 610 requested by a client computer system. The view is distorted since the view is illustrated within the spherical coordinate space. To construct the view 630 at a client system, a server (such as server 400) transmits tiles 621, 623, 625, and 627. Each tile 621, 623, 625, and 627 is compressed before transmission to further reduce the amount of information that needs to be transmitted. FIG. 6B illustrates how the four tiles 621, 623, 625, and 627 from the server are used to construct client view 630 on a client computer system. (The four tiles 621, 623, 625, and 627 appear distorted since the tiles are displayed in the rectangular projection coordinate space of FIG. 6B.)

Referring back to FIG. 6A, if a user moves the view 630 further to the right, then the view will cease to need tiles 621 and 623 and will instead begin to need tiles 628 and 629. To accommodate for such situations, the client system begins requesting tiles that are just slightly out of a current view when a view nears the edge of a tile in case the user moves further in that direction. Thus, in the example of FIG. 6A, the client system would begin requesting tiles 628 and 629 when the view shifts a little further to the right. Thus, the tile fetching program in the server would fetch and transmit tiles 628 and 629 to the client system. Then, if the client view 630 progresses even further to the right, tiles 623, 628, 627, and 629 would be used to construct the shifted client view in the client system.

In a preferred embodiment, the client computer system is responsible for determining when the out of view tiles are needed and when they should be transmitted. The client system makes this determination by examining factors such as how fast the user is moving the view, the latency of the connection with the server, and the parameters that define the views. The client computer system transmits a list of desired tiles to the server wherein the list of desired tiles define which tiles should be transmitted by the server to the client computer system.

The movement anticipation. procedure described in the previous two paragraphs works well for small incremental client view shifts (which most view changes comprise). However, if a user makes a sudden quick view change, the needed tiles will not be available. For example, referring to FIG. 7, a user may quickly shift a view from a first view position 730 to a second view position 740. The first view position 730 was being rendered with tiles 721, 723, 725, and 727 that were being sent a server. The new second view position 740 requires tiles 751, 753, 755, and 757 which are not being transmitted.

To handle such sudden view changes, the present invention occasionally transmits a highly compressed version of the full panoramic image intermediate planar representation. The highly compressed panoramic image intermediate planar representation is only transmitted once every 30 or so normal frames. When a fast movement occurs, the client renders a view from the most recently received highly compressed panoramic image intermediate planar representation. This newly rendered view will not be in the normal resolution since it is being rendered from the highly compressed panoramic image intermediate planar representation. Simultaneously, the server will begin transmitting the tiles needed at the new view location.

In the example of FIG. 7A, the server will begin transmitting tiles 751, 753, 755, and 757. When tiles 751, 753, 755, and 757 are received by the client computer system, the image rendered from the most recently received highly compressed panoramic image intermediate planar representation will be replaced with an image rendered from tiles 751, 753, 755, and 757. Thus, the new view image will become clearer once the server "catches up" to the users sudden view change.

A sudden movement may not move the view completely away from the currently available tiles. For example, a movement may place the view partially on tiles that are available and partially on tiles that are not available. In such a situation, the portion of the view that is located on available times can be rendered at the resolution of those tiles and the remainder of the view will be rendered using the highly compressed version. Similarly, if the user is "zoomed in" on high resolution tiles and the user moves quickly away from the currently available high resolution tiles, the view may be constructed using the tile from the next lower resolution tier if that tile is still available.

Figure 8:
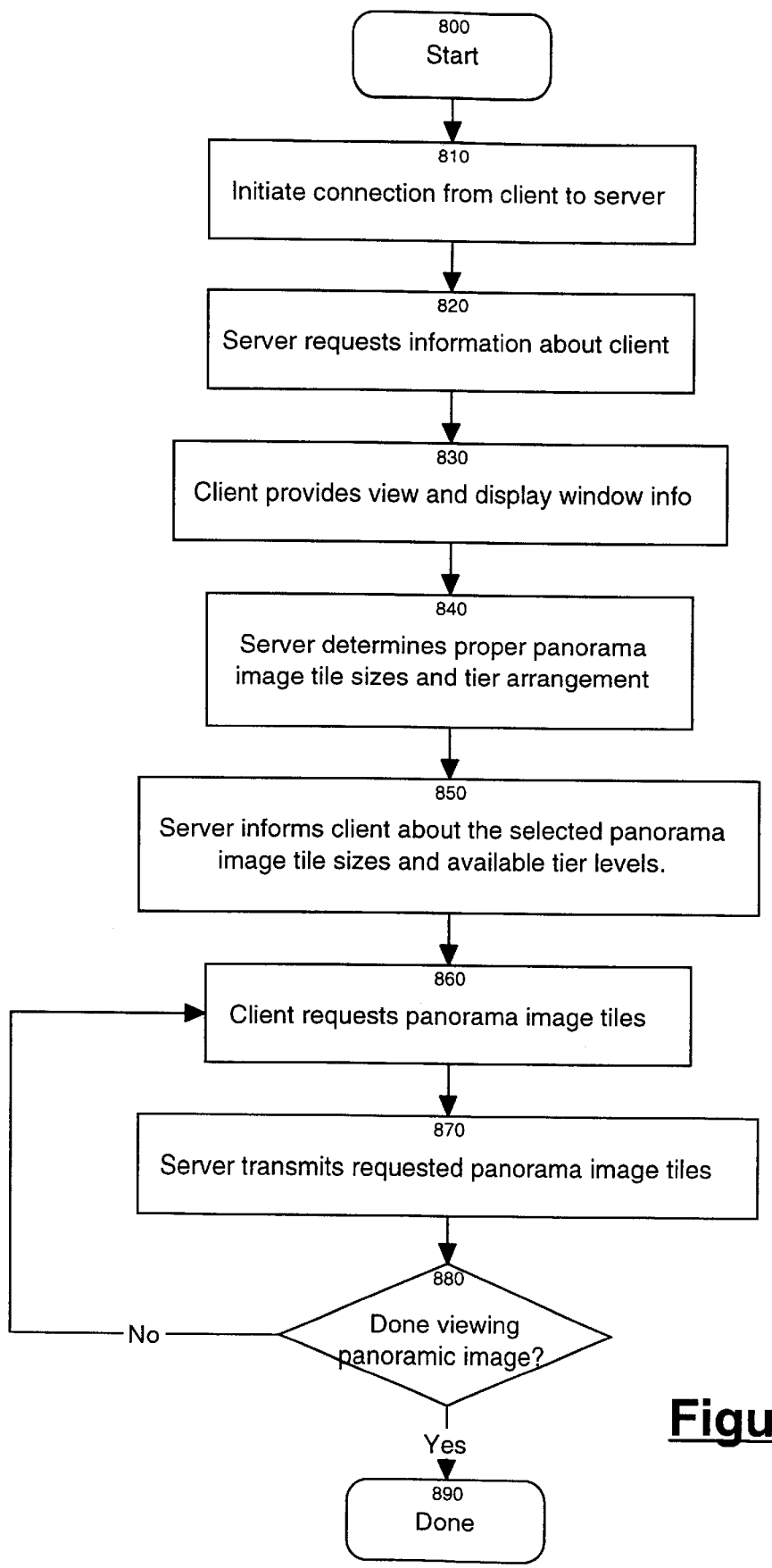
FIG. 8 illustrates a flow diagram that describes how a panoramic image client system negotiates a connection with a motion panoramic image server.
Figure 9:
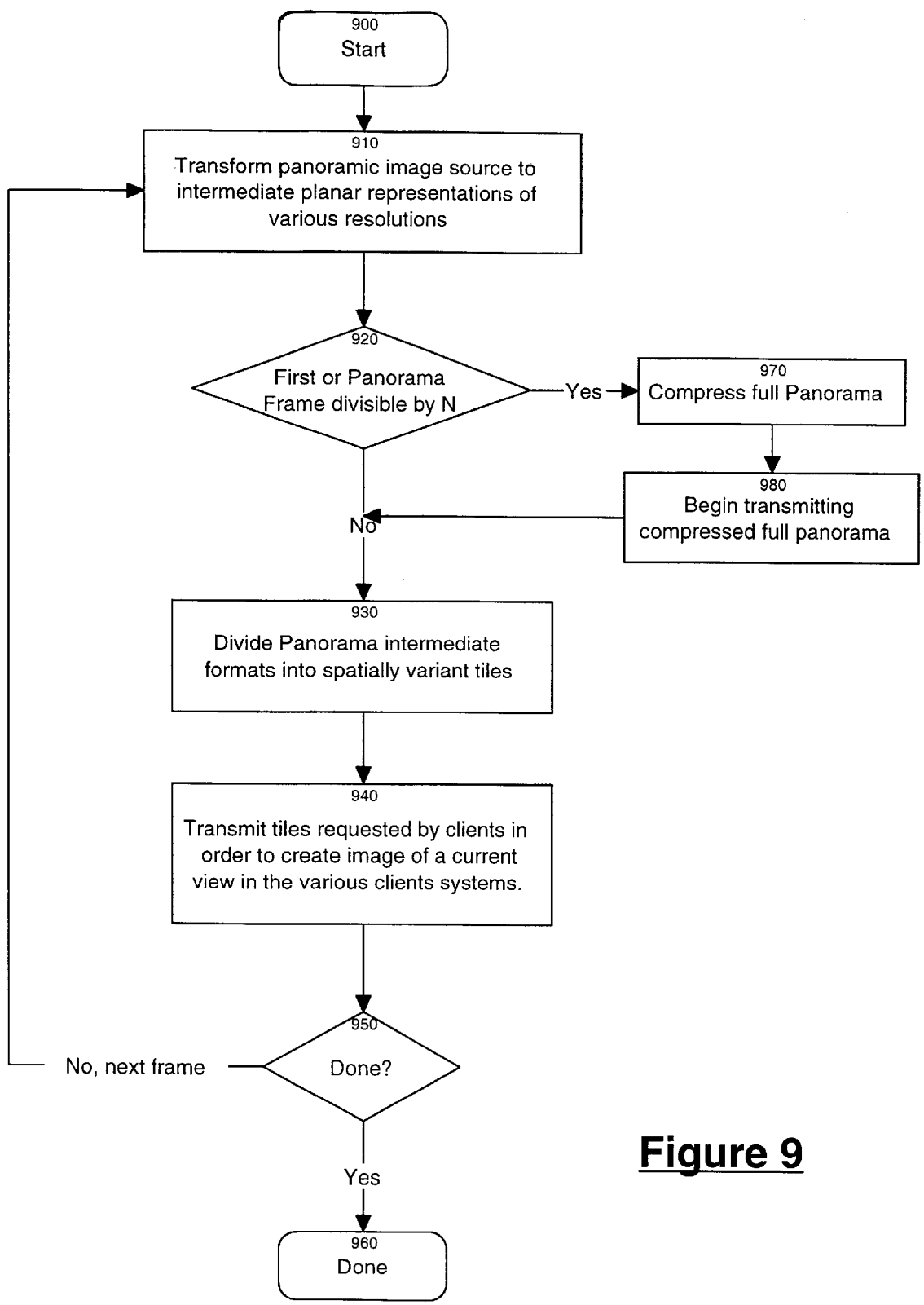
FIG. 9 illustrates a flow diagram that describes how a motion panoramic image server sends image tiles to a panoramic image client.

FIGS. 8 and 9 provide detailed flow diagrams that fully describe how the electronic image distribution system of FIG. 4 operates. FIG. 8 illustrates a flow chart describing one embodiment wherein a panoramic motion image server system and client system negotiate a connection. However, it should be noted that in other embodiments, a standard connection can be used such that there is no negotiation of connection parameters. FIG. 9 describes how a server system transmits image tiles to a client system.

Client-Server Motion Panoramic Image Connection Negotiation

FIG. 4 illustrates one embodiment of a motion panoramic image client-server system wherein the bandwidth is conserved by dividing panoramic images into tiles. It should be noted that there is often not a "standard" server and client environment. Specifically, the clients, the server, and the network in a client-server environment may all vary depending on the circumstances. The capabilities of each different panoramic server system and each different panoramic client system would vary depending upon the systems specifications including the computer make, the processor type, the processor generation, the amount of random access memory available, the bus speed, and the operating system.

To most efficiently distribute motion panoramic images from a motion panoramic image server to clients, the present invention has a client-server negotiation. The server system determines the characteristics of the client before determining how the client-server system will operate. FIG. 8 illustrates a flow diagram describing the method of negotiating the client-server motion panoramic image connection.

Referring to FIG. 8, a client initiates a connection to a panoramic image server at step 810. Next at step 820, the panoramic image server requests information that describes the display characteristics the client. Specifically, the server may request the client's frame buffer size, the client's frame buffer color characteristics, the size of the panoramic image view window, and other information relevant to the display of images on the client system. The motion panoramic image server may also request information describing the processing abilities of the client. For example, the panoramic image server may request the processor type, the processor speed, and the amount of main memory available. The client responds to the server's by sending this information to the motion panoramic image server at step 830.

At step 840, the motion panoramic image server uses the collected information to determine how the server will serve the client. One specific parameter that the server must decide is how to divide the unwrapped panoramic intermediate planar representation into tiles. Specifically, the size of the individual tiles will be determined. The motion panoramic image server may also determine the video frame-rate, a type of compression to use, and a processing-task division based upon the network connection speed and quality, the capabilities of the client system, and the current and anticipated processing load of the image server.

After determining the parameters of the motion panoramic image connection, the motion panoramic image server transmits the connection parameters to the client system at step 850. The client system will use the parameters to determine how the client system will display motion panoramic images.

After the client and server have negotiated the motion panoramic image connection, the client begins requesting motion panoramic image information from the server system at step 860. In response to the requests, the server begins transmitting motion panoramic image tiles to the client system at step 870. Since the connection to each client is uniquely calibrated, the server will transmit panoramic image information to each different client in a manner that is specific to that particular client. The server will continue transmitting motion panoramic images until the client requests the server to stop sending images at step 880.

Motion Panoramic Image Server Operation

FIG. 9 describes how the motion panoramic image server transmits the information needed to construct a view within a motion panoramic image on a client system. Thus, FIG. 9 describes in detail what occurs during the steps 860 and 870 of FIG. 8.

Referring to step 910 of FIG. 9, the first step that the motion panoramic image server must perform is transforming a panoramic image frame into one or more intermediate planar representations. The exact method of transforming a panoramic image frame is dependent on the type of camera system used. For example, a system built using the panoramic camera system of FIG. 1 would perform a geometric transformation to transform the annular panoramic image frame into the selected intermediate planar representation. If a fisheye lens panoramic camera system were used, a different geometric transformation would transform the distorted fisheye image into the desired intermediate planar representation. All subsequent actions are performed on the transformed intermediate planar representation.

In an embodiment with magnification, the source panoramic image data is transformed into more than one intermediate planar representations of different resolutions. For example, the source panoramic image data can be transformed into low, medium, and high resolution intermediate planar representations as illustrated in FIGS. 5D, 5E and 5F.

After the panoramic image frame has been transformed into an intermediate planar representation, the method proceeds to step 920. At step 920, the method determines if a highly compressed version of the full panoramic image frame should be transmitted. As previously set forth, a highly compressed version of the full panoramic image frame is transmitted occasionally to handle sudden movements of the clients view. In one embodiment, the motion panoramic image server transmits a highly compressed version of the full panoramic image frame during first and every Nth subsequent frame. Thus, during the first and every Nth subsequent frame, the method proceeds to step 970 where the full panoramic image frame is compressed. Then, at step 980, the motion panoramic image server begins transmitting the highly compressed version of the full panoramic image frame. The transmission of the highly compressed version of the full panoramic image frame may occur all at once. Alternatively, the highly compressed version of the full panoramic image frame may be transmitted concurrently along with individual image tiles such that individual image tiles are not delayed.

Next, at step 930, the one or more intermediate planar representation frames are divided into individual tiles as illustrated in FIGS. 5D, 5E and 5F. The size of the individual tiles is the size that was negotiated during the connection process described in the flow diagram of FIG. 8.

After the frame has been divided into individual tiles, the server then fetches and transmits the tiles needed to create the client's view at step 940. Each tile is compressed before transmission to conserve bandwidth and decrease latency. The client will use the transmitted tiles to construct a image.

At step 950, the server method determines if the client system is done viewing the motion panoramic image. If the client is not done, the method proceeds back to step 960.

Motion Panoramic Image Server Operation

Figure 10:
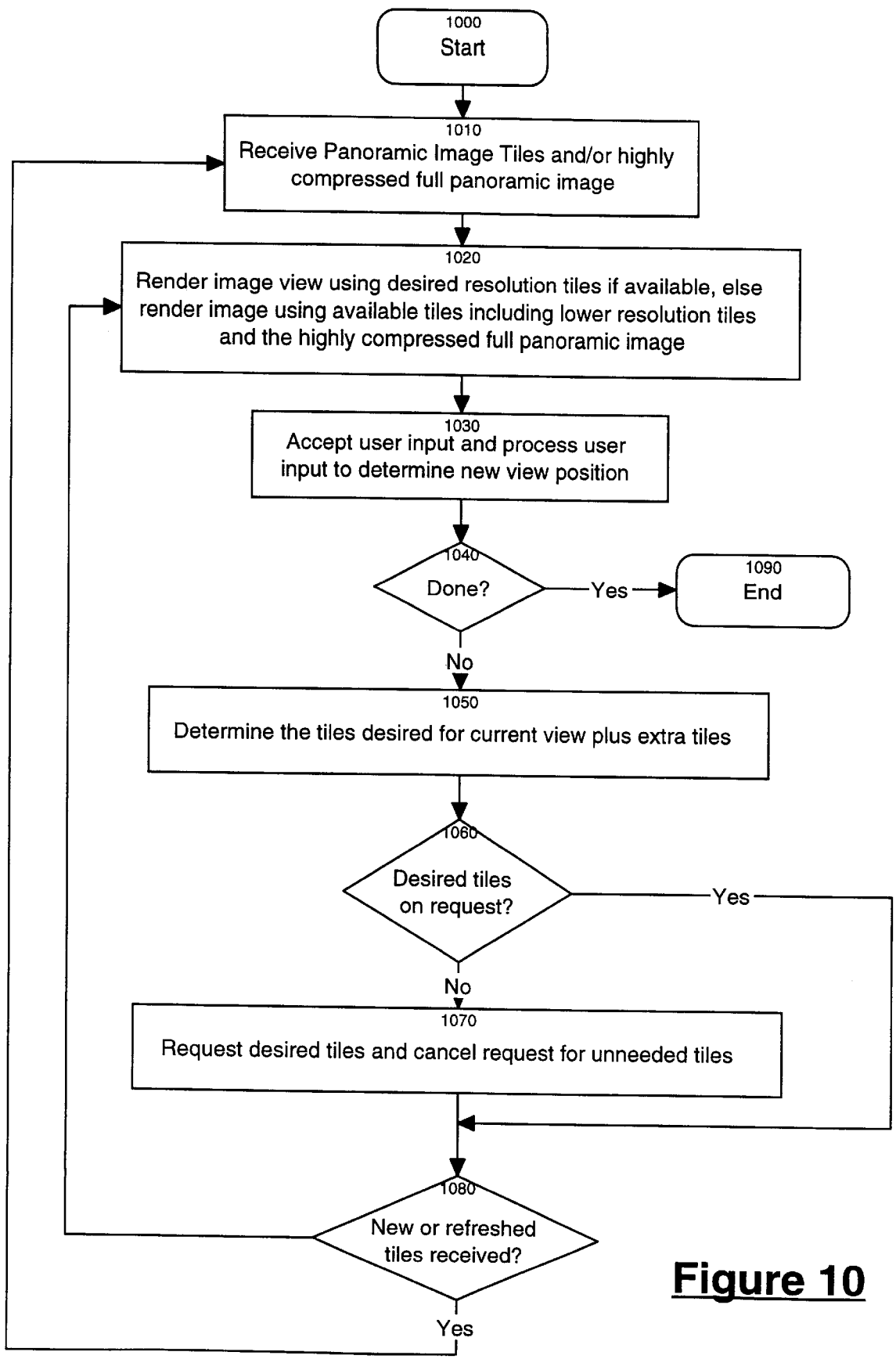
FIG. 10 illustrates a flow diagram that describes how a motion panoramic image client renders a panoramic image view using image tiles received from a server.

FIG. 10 illustrates a flow diagram describing a method that a client system may follow to receive information from render an image. It should be noted that FIG. 10 only illustrates one possible embodiment of a client system and that significant variations may be created. For example, several of the steps described in FIG. 10 such as receiving tiles and rendering an image may be performed concurrently. Alternatively, less processing could be performed in the client system and more processing could be performed in the server.

Referring to step 1010 of FIG. 10, the client receives any and all request panoramic image tiles and highly compressed full panoramic images transmitted by the server. At step 1020, the client attempts to render an image for the current view position. Ideally, the view will be rendered with the tiles needed for the view. However, if the client does not have the desired tiles, then the client renders an image of the current view using the available tiles for the view, tiles from lower resolution tiers, and the most recently received version of the highly compressed full panoramic image.

After rendering an image frame, the client system accepts input from a user at step 1030. The client system may accept input such as directional commands from a computer mouse that pan the view within the panoramic image. The client may also accept commands that zoom-in and change the vertical viewing angle.

The client system then processes the user input to the server system at step 1030 to determine a next view position. At step 1040, the client system determines if the input specifies that the user is done viewing the panoramic image information. The client panoramic image rendering program will terminate when the user no longer wishes to view the panoramic image.

At step 1050 the client system determines the frame tiles that are needed to create the new view position. The client system also determines if it should request tiles that are just out of the current view but are likely to be needed in the future. Specifically, the client determines if the current view is near the edge of a tile. If the client's view is near the edge of a tile, then the client will request tiles that are just outside of the client's current view. The tiles just out of view are requested such that if the client moves the view beyond the edge of the tile, then the client will be able to create a view without having to request and wait for the server to then send the needed tile. Thus, the client anticipates small view movements and is prepared to generate a view. However, if the user makes a sudden large view change, then the client rendering engine can always fall back to the highly compressed version of the full panoramic image.

Furthermore, at step 1050, the client system determines if any currently requested tiles are no longer needed. Tiles that are no longer needed consume valuable bandwidth such that the client system should unsubscribe from tiles that are no longer needed.

After determining the tiles needed for the current view, the client system determines at step 1060 if the needed tiles have already been requested and if there are no unnecessary tiles on request. If the needed tiles have already been requested and there are no unnecessary tiles on request, then the client system does not need to change the tile subscriptions. However, if new tiles are needed or currently subscribed tiles are no longer needed, then the client system sends a request to the server at step 1070 that changes the tile subscription.

At step 1080 the client system determines if any new frame tiles or compressed panoramic image frames have been received. If new frames have been received, then the method proceeds back to step 1010 to accept the new frames. Otherwise, the method proceeds back to step 1020 to render a new view image using the currently available tiles and the highly compressed full panorama image information. A different image may be generated from the same frame information if the user has shifted the view.

Overlapping Tile Embodiment

Figure 11:
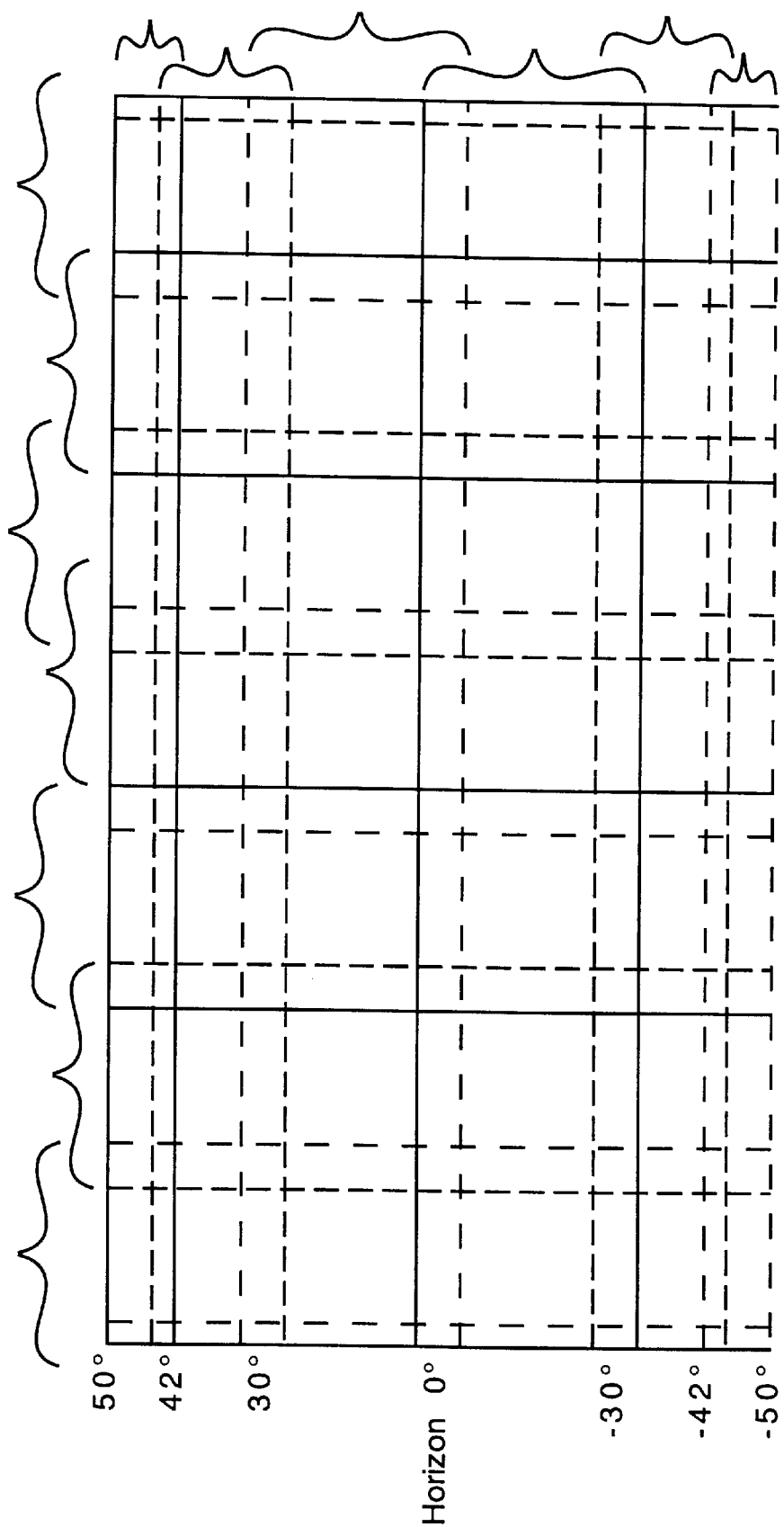
FIG. 11 illustrates a panoramic image frame in an intermediate planar representation that has been divided into overlapping tiles.

In one proposed embodiment, the panoramic image intermediate planar representation is divided into overlapping tiles. An example of this is provided in FIG. 11. By dividing the intermediate planar representation into overlapping tiles, a degree of Hysteresis is provided such that small back and forth view changes will not cause the client system to oscillate requests for new tiles.

A Second Motion Panoramic Image Distribution System Embodiment

The selective tile transmission system described in the previous section provides a useful method of delivering motion panoramic image information in a unicast environment where each client receives a unique individual data stream. However, since the motion panoramic server must send out a unique data stream to each client, there will be a significant amount of redundant information being transmitted. To reduce the amount of redundant information being transmitted, the present invention also introduces a second multicast motion panoramic image serving system.

Figure 12:
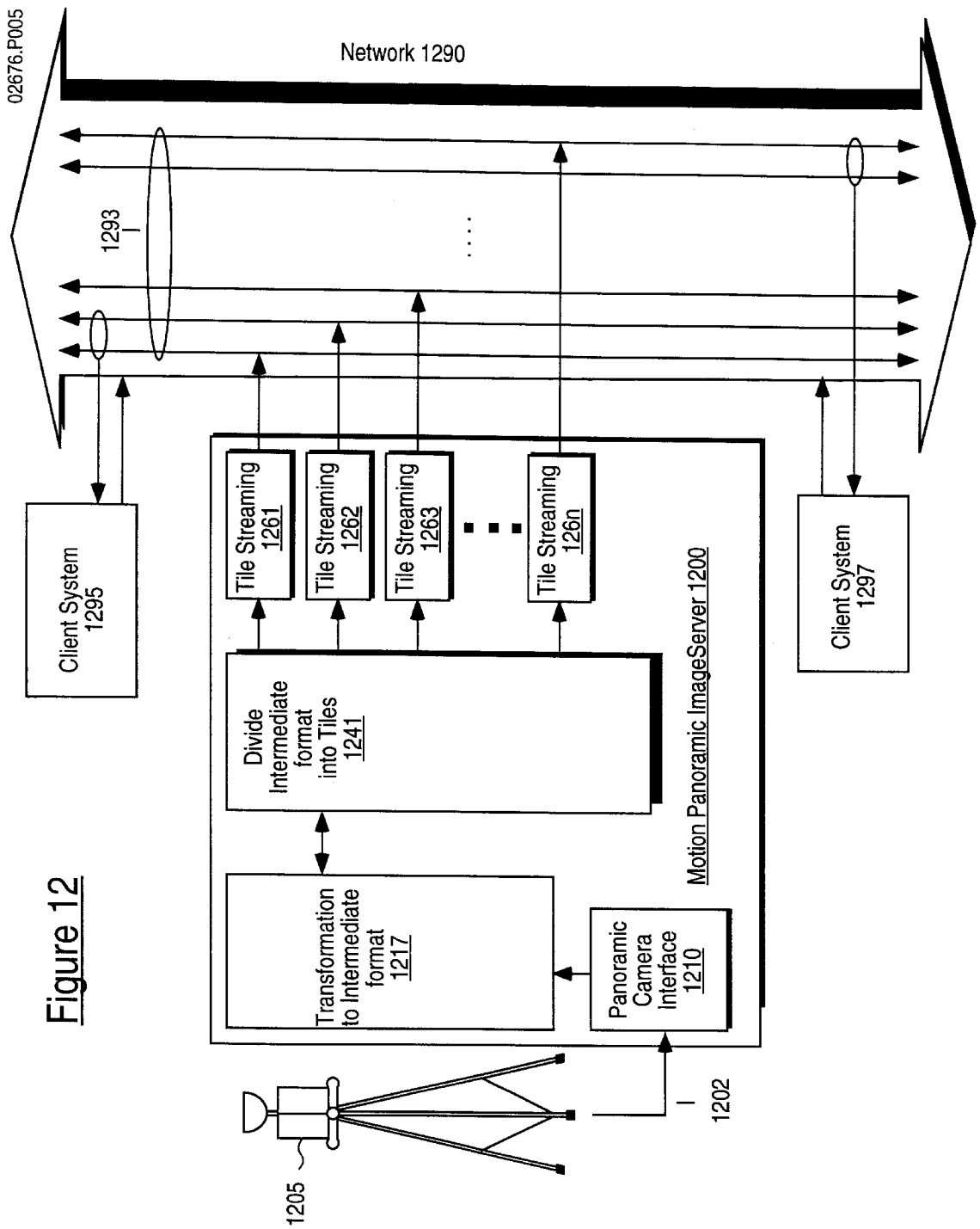
FIG. 12 illustrates a networked computer arrangement wherein a panoramic image server distributes motion panoramic image tiles on individual multicast channels.

FIG. 12 illustrates a multicast motion panoramic image serving system constructed according to the teachings of the present invention. In the system of FIG. 12, a motion panoramic camera system 1205 delivers a series of high resolution panoramic images across a high bandwidth link 1202 to a motion panoramic server 1200. A Panoramic Camera Interface 1210 handles the communication with the motion panoramic camera system 1205. A transformation unit 1217 transforms the raw panoramic image frames into an intermediate planar representation. As previously set forth, two possible intermediate planar representations are cylindrically encoded intermediate planar representation and spherically encoded intermediate planar representation.

After a panoramic image frame has been transformed into an intermediate planar representation, the intermediate planar representation is divided into individual tiles by unit 1241. After dividing the intermediate planar representation into individual tiles, a set of tile streaming units 1261, 1262, 1263, ... 126n transmit the tiles on multicast channels 1293 on a high bandwidth network 1290. Specifically, each tile position is assigned its own multicast channel.

To display a view within a motion panoramic image, each client system subscribes to the multicast channels that carry the tiles needed to construct the desired view. For example, client system 1295 needs the two tiles delivered by tile streaming units 1261 and 1262 such that client system 1295 subscribes to the multicast channels transmitted by those tile streaming units.

Figure 13:
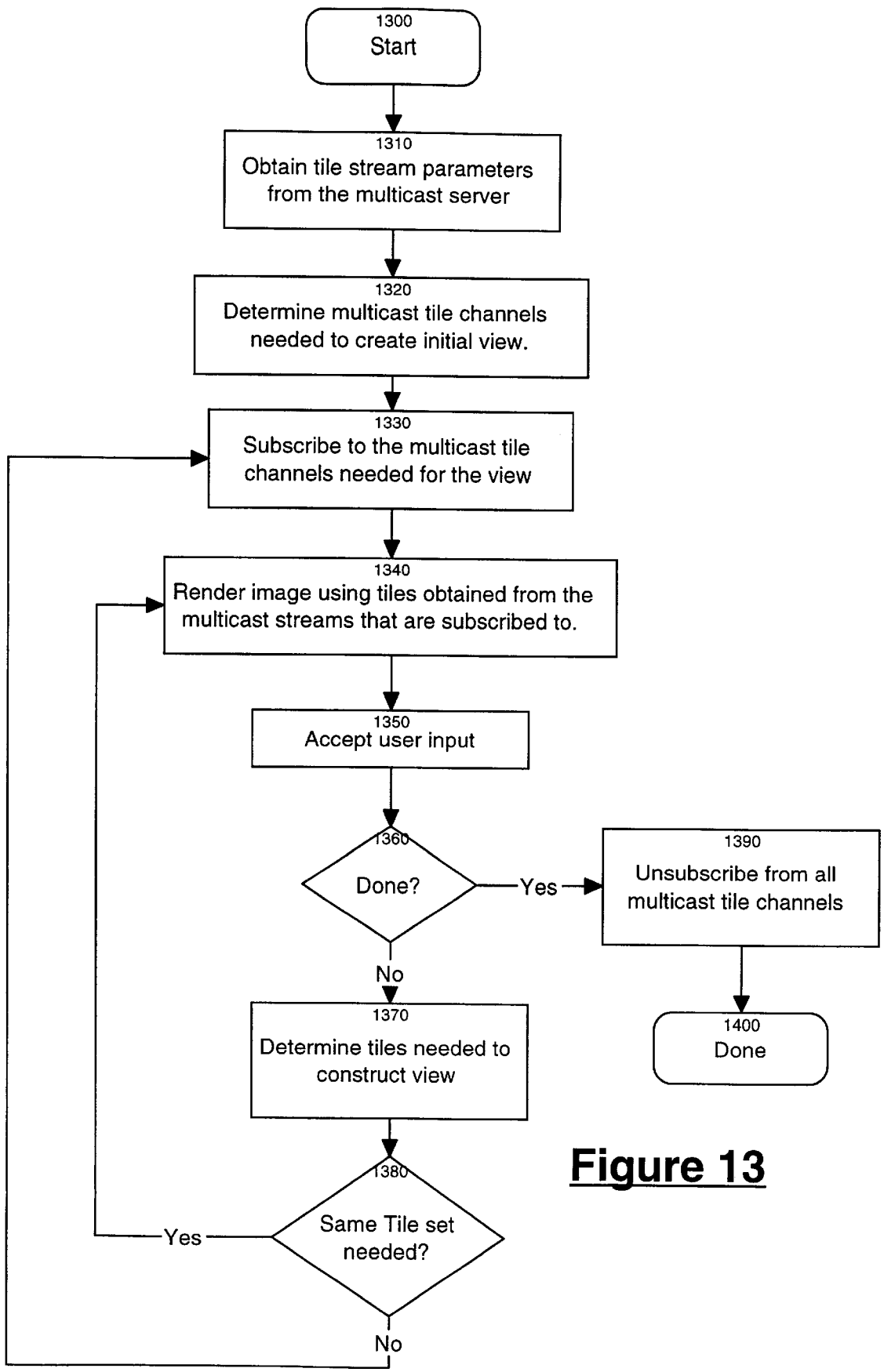
FIG. 13 illustrates a flow diagram that describes how a motion panoramic image client subscribes to multicast panoramic image tile channels and renders an image using received image tiles.

FIG. 13 provides a flow diagram that describes one possible method that a client system may follow to render a view from a motion panoramic server constructed according to the teachings of FIG. 12. Initially, at step 1310, the client system subscribes to the multicast panoramic tile channels necessary to render a view from an initial view location. Routers and switches that couple the client system to a main multicast backbone will perform the necessary operations in order to begin delivering the subscribed multicast panoramic tile channels.

Next, at step 1320, the client system will render an image of the current view using the information from the subscribed multicast panoramic tile channels. It should be noted that other client systems will share the same multicast channels such that bandwidth is conserved.

At step 1330, the client system accepts input from the user. The client system may accept input such as directional commands from a computer mouse that pan and tilt the user's view within the motion panoramic image.

After accepting the user's input, the client system analyzes the user's input. If the user has indicated that he is done viewing the motion panoramic image at step 1340, then the client system unsubscribe to all the multicast tile channels will stop displaying images as set forth in step 1370.

If the user's input changes the position of the view within the motion panoramic image, then the client system determines the tiles that will be necessary to render the new view position at step 1350. Specifically, referring back to FIG. 5, the client system determines which files comprise the current view location. At step 1360, the client determines if only the same tiles that are already subscribed to are needed. If so, then the method proceeds back to step 1320 to render a subsequent image view frame.

If different tiles are needed, then the client system proceeds to step 1310. At step 1310, the client system subscribes to the multicast tile channels needed to render the current view.

Figure 14:
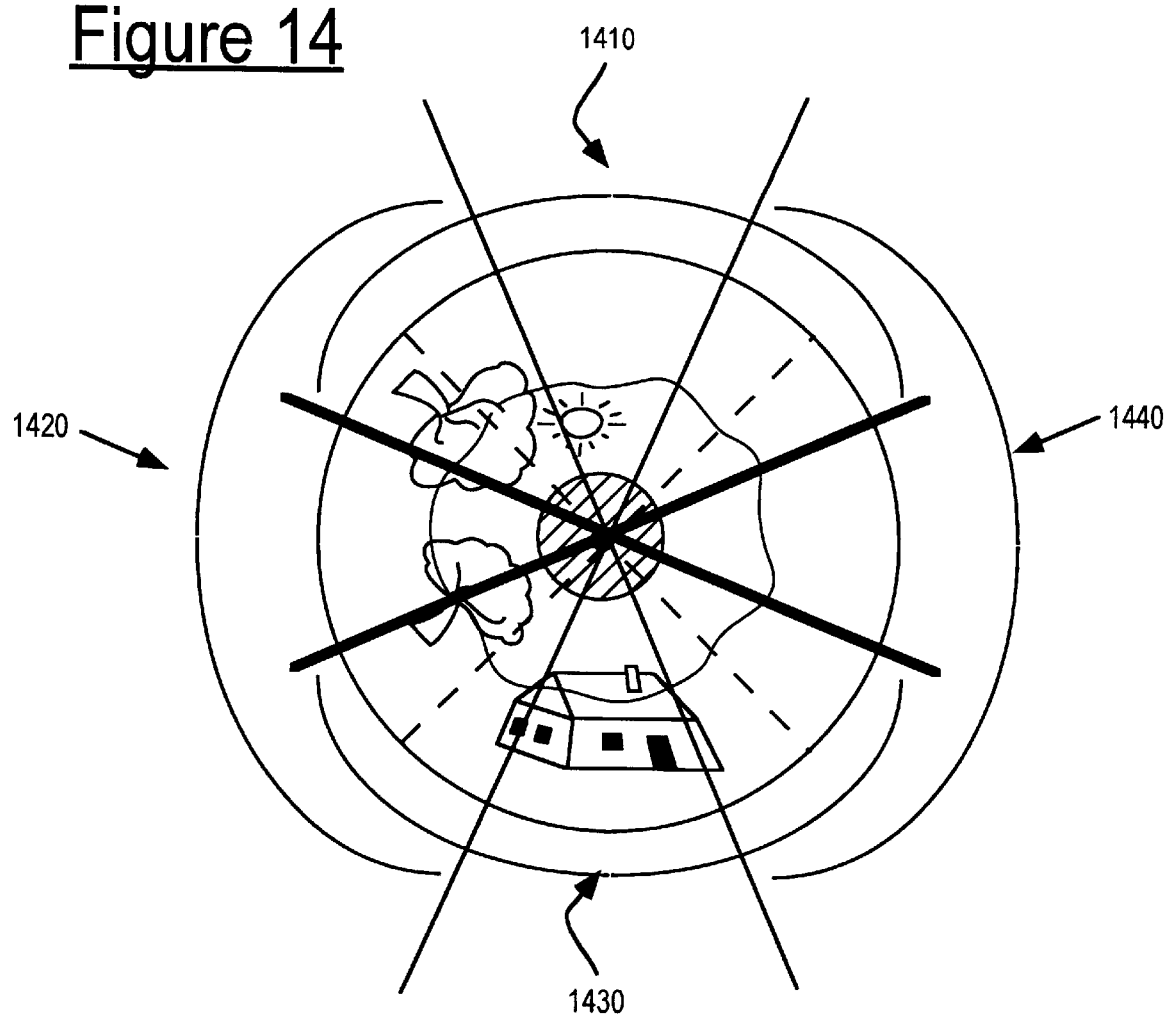
FIG. 14 illustrates a panoramic annular image divided into quadrants that are served on different multicast channels.

To limit the number of multicast channels used, the number of tiles that the panoramic image is divided into should be kept small. FIG. 14 illustrates one possible way of dividing the original source panorama. In the embodiment of FIG. 14, the source panorama is divided into four quadrants: an upper quadrant, a left quadrant, a right quadrant, and a lower quadrant. (The quadrant are illustrated using dotted lines.) Each quadrant becomes the source of a multicast channel. Thus, only four multicast channels are required.

To handle pans of the user's view, the information supplied for each quadrant should overlap the other quadrants such that only one multicast channels needs to be subscribed to. Ideally, the overlap area will be at least as large as a client view. Referring to FIG. 14, a set of overlapping quadrants are displayed: overlapping upper quadrant 1410, overlapping left quadrant 1420, overlapping lower quadrant 1430, overlapping right quadrant 1440.

If very fast pans occur, the multicasting embodiment may also include a highly compressed full panoramic image channel. The highly compressed full panoramic image channel would occasionally transmit a highly compressed version of the full panoramic image such that a view in any direction could be created.

To divide the processing that must be performed, multiple servers may be used. For example, a first server could generate and serve the multicast channel carrying the overlapping upper quadrant 1410, a second server could generate and serve the multicast channel carrying the overlapping left quadrant 1420, and so on.

Figure 15:
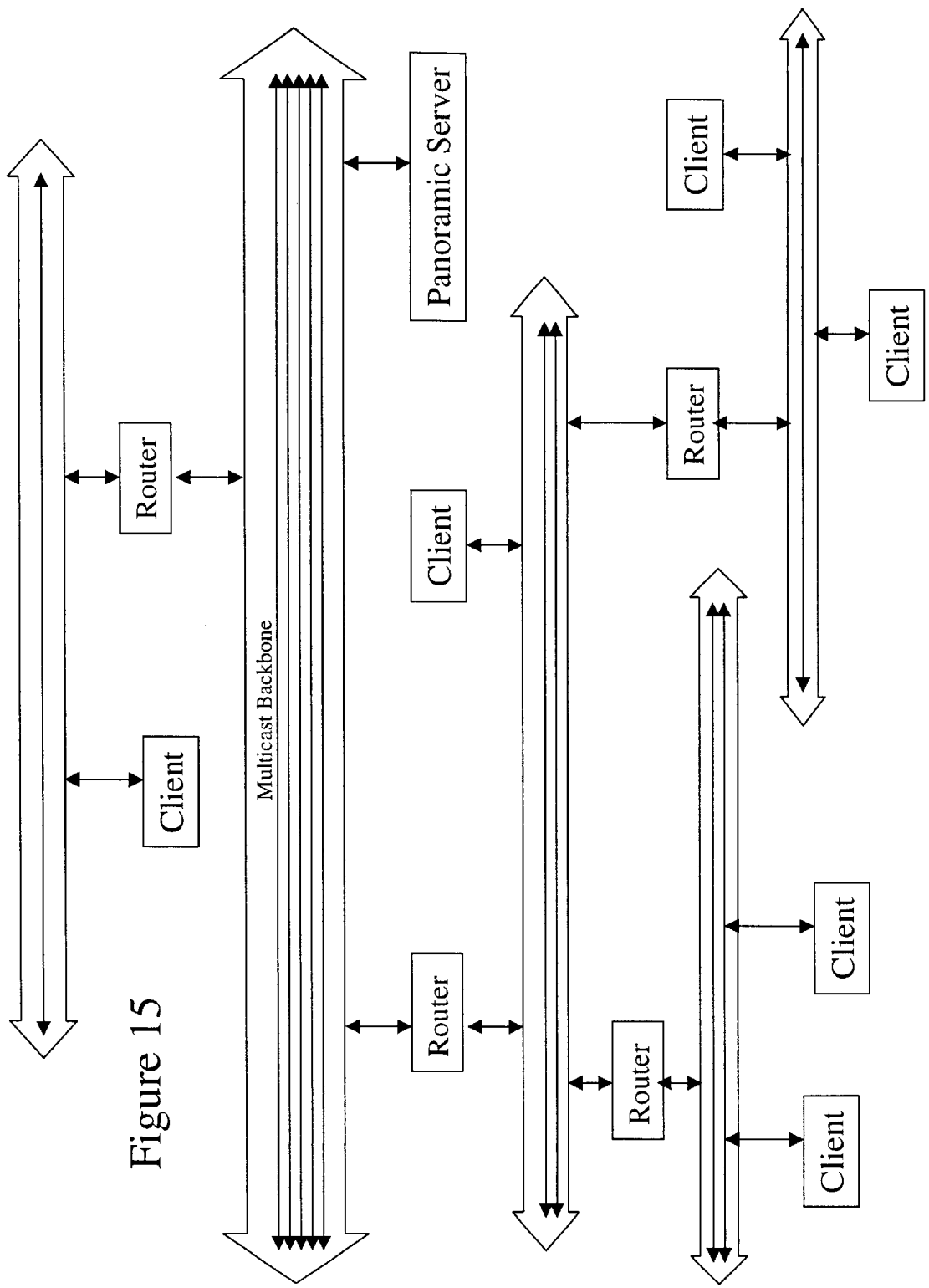
FIG. 15 illustrates a panoramic image server that transmits panoramic image information on different multicast channels on a multicast backbone and client systems that subscribe to the multicast channels.

FIG. 15 graphically illustrates how network bandwidth is conserved using a multicast type of system. Specifically, a panoramic image server transmits all the tile channels on a multicast backbone. Various routers coupled to the multicast backbone only route multicast channels subscribed to by clients connected to their subnetworks. By routing only the multicast channels needed by clients connected to their subnetworks, the routers limit the tile information carried by the subnetworks.

The foregoing has described methods and apparatuses for electronically distributing motion panoramic images. It is contemplated that changes and modifications may be made by one of ordinary skill in the art, to the materials and arrangements of elements of the present invention without departing from the scope of the invention.

We claim:

1. An electronic image distribution apparatus, said apparatus comprising:
   a motion panoramic image source, said motion panoramic image source providing successive frames of panoramic images;
   a division unit, said division unit dividing said successive frames of panoramic images into tiles, said tiles being spatially variant; and
   a transmitter, said transmitter transmitting a first set of selected tiles to a first client system to construct a view in said client system.

2. The electronic image distribution apparatus as claimed in claim 1 wherein said transmitter divides said tiles into a size also dependent upon said first client system.

3. The electronic image distribution apparatus as claimed in claim 1 further comprising:
   a transformation unit, said transformation unit transforming said successive frames of panoramic images into an intermediate planar representation before passing said frames to said division unit.

4. The electronic image distribution apparatus as claimed in claim 3 wherein said intermediate planar representation is a spherical projection representation.

5. The electronic image distribution apparatus as claimed in claim 3 wherein said intermediate planar representation is a cylindrical projection representation.

6. The electronic image distribution apparatus as claimed in claim 3 wherein said transformation unit creates more than one intermediate planar representation wherein each intermediate planar representation has different resolution levels.

7. The electronic image distribution apparatus as claimed in claim 1 wherein said panoramic image frames comprise an annular panoramic image format.

8. The electronic image distribution apparatus as claimed in claim 1 wherein said transmitter compresses said tiles.

9. The electronic image distribution apparatus as claimed in claim 1 further comprising:
   a compression unit, said compression unit occasionally compressing one of said successive frames of panoramic images into a highly compressed format and transmitting said highly compressed format to said first client system.

10. The electronic image distribution apparatus as claimed in claim 9 wherein said compression unit compresses every Nth of said successive frames of panoramic images into said highly compressed format.

11. The electronic image distribution apparatus as claimed in claim 1 wherein said client system requests said first set of selected tiles.

12. The electronic image distribution apparatus as claimed in claim 1 wherein said transmitter further transmits a second set of selected tiles to a second client system.

13. The electronic image distribution apparatus as claimed in claim 12 wherein said second client system requests said second set of selected tiles.

14. The electronic image distribution apparatus as claimed in claim 1 wherein said tiles overlap each other.

15. The electronic image distribution apparatus as claimed in claim 1 wherein transmitter transmits more than just the tiles needed to render said view in said client system.

16. A method of distributing electronic images, said method comprising the steps of:
   capturing a panoramic image frame;
   dividing said panoramic image into a plurality of tiles, said tiles being spatially variant; and
   selectively transmitting a subset of said plurality of tiles to a first client system.

17. The method of distributing electronic images as claimed in claim 16 further comprising:
   transforming said panoramic image frame into an intermediate planar format.

18. The method of distributing electronic images as claimed in claim 17 wherein said intermediate planar representation comprises a spherical projection representation.

19. The method of distributing electronic images as claimed in claim 17 wherein said intermediate planar representation comprises a cylindrical projection representation.

20. The method of distributing electronic images as claimed in claim 17 wherein transforming said panoramic image frame comprises transforming said panoramic image frame into more than one intermediate planar format wherein each intermediate planar format has a different resolution level.

21. The method of distributing electronic images as claimed in claim 17 wherein said tiles are divided into a size further dependent upon said first client system.

22. The method of distributing electronic images as claimed in claim 16 wherein said first client system specifies which tiles must be transmitted to render a view on said client system.

23. The method of distributing electronic images as claimed in claim 16 wherein said client system requests outside tiles just outside of said view in case said client system needs said outside tiles for a future view.

24. The method of distributing electronic images as claimed in claim 16 further comprising:
   transforming said panoramic image frame into a highly compressed intermediate planar format frame; and
   transmitting said highly compressed intermediate format frame to said first client system.

25. The method of distributing electronic images as claimed in claim 16 wherein said subset of said plurality of tiles are compressed before being transmitted.

26. The method of distributing electronic images as claimed in claim 16 wherein said plurality of tiles overlap each other.

27. The method of distributing electronic images as claimed in claim 16 further comprising:

selectively transmitting a second subset of said plurality of tiles to a second client system.

28. An electronic image distribution apparatus, said apparatus comprising:

a motion panoramic image source, said motion panoramic image source providing successive frames of panoramic images;

a divider, said divider dividing said successive frames of panoramic images into a set of individual tiles; and a transmitter, said transmitter transmitting tiles on multicast channels.

29. The electronic image distribution apparatus as claimed in claim 28 further comprising:

a transformation unit, said transformation unit transforming said successive frames of panoramic images into an intermediate planar format.

30. The electronic image distribution apparatus as claimed in claim 29 wherein said intermediate planar format comprises a spherical projection representation.

31. The electronic image distribution apparatus as claimed in claim 29 wherein said intermediate planar representation comprises a cylindrical projection representation.

32. The electronic image distribution apparatus as claimed in claim 28 wherein said successive frames of panoramic images comprise annular panoramic image frames.

33. The electronic image distribution apparatus as claimed in claim 28 further comprising:

a first client system, said first client system subscribing to a first set of multicast channels needed to render a first image.

34. The electronic image distribution apparatus as claimed in claim 33 further comprising:

a second client system, said second client system subscribing to a second set of multicast channels needed to render a second image, wherein said first image and said second image can differ.

35. The electronic image distribution apparatus as claimed in claim 28 wherein said transmitter compresses said individual tiles.

36. The electronic image distribution apparatus as claimed in claim 28 wherein said multicast channels comprise multicast streams on the Internet.

37. An electronic image distribution method, said method comprising:

capturing successive frames of panoramic images;

dividing said successive frames of panoramic images into a set of individual tiles, said tiles being spatially variant; and transmitting said individual tiles on individual multicast channels.

38. The method as claimed in claim 37 further comprising:

transforming said successive frames of panoramic images into an intermediate planar representation.

39. The method as claimed in claim 37 further comprising:

subscribing a first client system to multicast channels needed to render a first view into said panoramic image on said first client system.

40. The method as claimed in claim 39 further comprising:

subscribing a second client system to multicast channels needed to render a second view into said panoramic image on said second client system.

41. The method as claimed in claim 37 wherein said individual tiles are compressed before transmitting.

42. The method as claimed in claim 39 wherein said multicast channels comprise multicast streams on the Internet.

* * * * *